(12) United States Patent
Torabi et al.

(10) Patent No.: US 11,851,015 B2
(45) Date of Patent: Dec. 26, 2023

(54) IN-CABIN HAZARD PREVENTION AND SAFETY CONTROL SYSTEM FOR AUTONOMOUS MACHINE APPLICATIONS

(71) Applicant: NVIDIA Corporation, Santa Clara, CA (US)

(72) Inventors: Atousa Torabi, Santa Clara, CA (US); Sakthivel Sivaraman, Santa Clara, CA (US); Niranjan Avadhanam, Saratoga, CA (US); Shagan Sah, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/939,622

(22) Filed: Sep. 7, 2022

(65) Prior Publication Data
US 2023/0001872 A1    Jan. 5, 2023

Related U.S. Application Data

(63) Continuation of application No. 16/915,577, filed on Jun. 29, 2020, now Pat. No. 11,485,308.

(51) Int. Cl.
*B60R 21/017*    (2006.01)
*B60R 21/013*    (2006.01)
(Continued)

(52) U.S. Cl.
CPC .......... *B60R 21/017* (2013.01); *B60R 21/013* (2013.01); *B60W 50/14* (2013.01);
(Continued)

(58) Field of Classification Search
CPC ............... B60W 60/005; B60W 50/14; B60W 2050/0062; B60R 21/013;
(Continued)

(56) References Cited

U.S. PATENT DOCUMENTS 5,541,590 A * 7/1996 Nishio ................... B60K 28/14
                                                      348/148
6,501,536 B1  12/2002 Fredricks
(Continued)

OTHER PUBLICATIONS

Luvizon, D., Picard, D., & Tabia, H. (2020). Multi-task Deep Learning for Real-Time 3D Human Pose Estimation and Action Recognition. IEEE Transactions on Pattern Analysis and Machine Intelligence.
(Continued)

*Primary Examiner* — Gertrude Arthur Jeanglaude
(74) *Attorney, Agent, or Firm* — Taylor English Duma L.L.P.

(57) ABSTRACT

In various examples, systems and methods are disclosed that accurately identify driver and passenger in-cabin activities that may indicate a biomechanical distraction that prevents a driver from being fully engaged in driving a vehicle. In particular, image data representative of an image of an occupant of a vehicle may be applied to one or more deep neural networks (DNNs). Using the DNNs, data indicative of key point locations corresponding to the occupant may be computed, a shape and/or a volume corresponding to the occupant may be reconstructed, a position and size of the occupant may be estimated, hand gesture activities may be classified, and/or body postures or poses may be classified. These determinations may be used to determine operations or settings for the vehicle to increase not only the safety of the occupants, but also of surrounding motorists, bicyclists, and pedestrians.

20 Claims, 16 Drawing Sheets

(51) Int. Cl.
*B60W 60/00* (2020.01)
*G06N 3/02* (2006.01)
*B60W 50/14* (2020.01)
*B60W 50/00* (2006.01)
*B60R 21/01* (2006.01)

(52) U.S. Cl.
CPC .............. *B60W 60/005* (2020.02); *G06N 3/02* (2013.01); *B60R 2021/01211* (2013.01); *B60R 2021/01286* (2013.01); *B60W 2050/0062* (2013.01)

(58) Field of Classification Search
CPC ........... B60R 2021/01211; B60R 2021/01286; G06N 3/02
See application file for complete search history.

(56) References Cited

U.S. PATENT DOCUMENTS

| | | | |
|---|---|---|---|
| 10,885,698 B2 | 1/2021 | Muthler et al. | |
| 11,423,671 B1 | 8/2022 | Chan et al. | |
| 11,485,308 B2* | 11/2022 | Torabi | B60W 50/14 |
| 2020/0242379 A1* | 7/2020 | Mabuchi | G06T 7/73 |
| 2022/0410830 A1 | 12/2022 | Torabi et al. | |
| 2023/0001872 A1 | 1/2023 | Torabi et al. | |

OTHER PUBLICATIONS

Habermann, M., Xu, W., Zollhofer, M., Pons-Moll, G., & Theobalt, C. (2020). Deepcap: Monocular human performance capture using weak supervision. In Proceedings of the IEEE/CVF Conference on Computer Vision and Pattern Recognition (pp. 5052-5063).

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

IEC 61508, "Functional Safety of Electrical/Electronic/Programmable Electronic Safety-related Systems," https://en.wikipedia.org/wiki/IEC_61508, accessed on Apr. 1, 2022, 7 pgs.

ISO 26262, "Road vehicle—Functional safety," International standard for functional safety of electronic system, https://en.wikipedia.org/wiki/ISO_26262, accessed on Sep. 13, 2021, 8 pgs.

Torabi, Atousa; Non-Final Office Action for U.S. Appl. No. 17/939,613, filed Sep. 7, 2022, dated May 9, 2023, 20 pgs.

* cited by examiner

BOTH-HANDS ON-WHEEL

LEFT-HAND ANSWER PHONE AND RIGHT HAND ON-WHEEL

LEFT HAND TEXTING AND RIGHT HAND ON-WHEEL

LEFT HAND DRINKING AND RIGHT HAND ON-WHEEL

BOTH HANDS OFF-WHEEL

LEFT HAND ON-WHEEL AND RIGHT HAND OFF-WHEEL

BODY JOINTS DURING NORMAL BEHAVIOR

BODY JOINTS DURING A SUDDEN SICKNESS EVENT

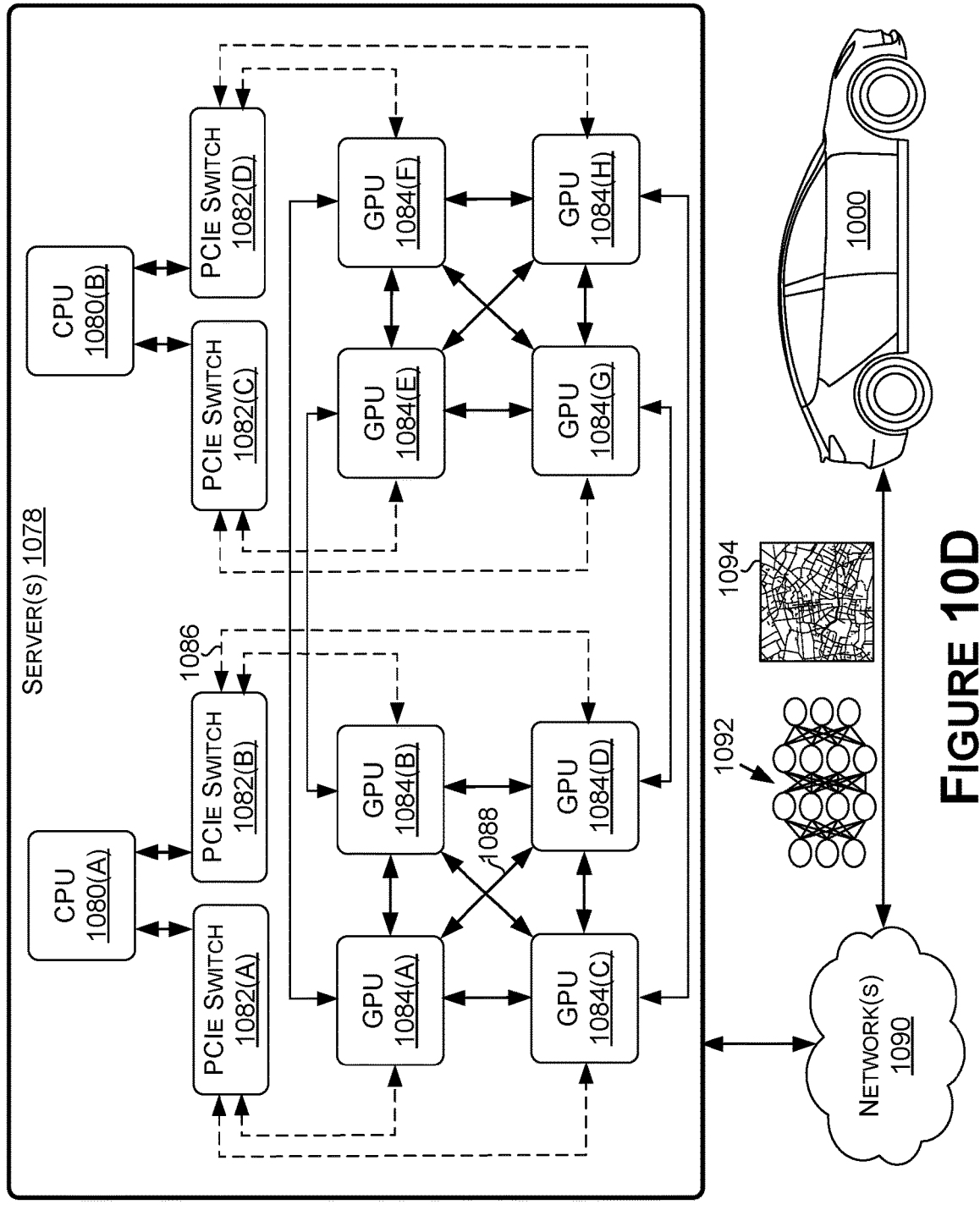

IN-CABIN HAZARD PREVENTION AND SAFETY CONTROL SYSTEM FOR AUTONOMOUS MACHINE APPLICATIONS

CROSS-REFERENCE TO RELATED APPLICATIONS

This application is a Continuation of U.S. application Ser. No. 16/915,577, file Jun. 29, 2020, which is hereby incorporated by reference in its entirety.

BACKGROUND

For autonomous vehicles to achieve driving level 2 or higher autonomous driving levels 3-5 (e.g., conditional automation (Level 3), high automation (Level 4), and full automation (Level 5), as defined by the Society of Automotive Engineers standard J3016), the autonomous vehicles must be capable of operating safely in all environments, and without the requirement for human intervention when potentially unsafe situations present themselves. In order to meet this standard, human-machine interactions may need to be adjusted and/or adapted based on how a driver and/or passenger is positioned or acting.

In conventional systems, dedicated sensors have been used that may allow for monitoring a driver or passenger within a vehicle. For instance, sensors may be used to detect the presence of a person using a weight sensor or heat sensor and, based on this detected weight or heat, human-machine interactions—such as airbag deployment—may be adjusted. However, merely relying on a weight of or heat generated by a person does not provide comprehensive analysis of what is happening in a vehicle—such as a posture or pose of individuals inside of the cabin. As such, some conventional systems have attempted to use raw images in an attempt to identify the presence of persons in a vehicle; however, such systems are often limited to a location of passengers in the vehicle and likewise fail at identifying actions, postures, or poses of a driver (e.g., hands on the wheel, hands off the wheel, preoccupied texting, reading, etc.) and/or passengers of the vehicle. As a result, the determinations of these systems may be limited, and may not result in determinations by the system that result in a safest or most comfortable action or outcome.

SUMMARY

Embodiments of the present disclosure relate to in-cabin hazard prevention and control for autonomous machine applications. Systems and methods are disclosed that accurately identify driver and passenger in-cabin activities (e.g., based on body position, size of person, classification of gestures, etc.) that may indicate a biomechanical distraction that prevents a driver from being fully engaged in driving a vehicle.

In contrast to conventional systems, such as those described above, the system of the present disclosure may act accordingly by performing one or more actions (e.g., provide notifications, perform a safety maneuver, etc.) based on identified in-cabin activities. The system may adapt and/or respond to an identified in-cabin activities to address needs and/or requirements related to the driver or passengers based on the identified in-cabin activity. For instance, driver and/passenger in-cabin activities may be determined at a more granular level, such as identifying specific hand gestures, body poses, body postures, occupancy maps, etc. Based on these driver and/passenger in-cabin activities, human-machine interactions may be adjusted and adapted to a current state of the occupants.

BRIEF DESCRIPTION OF THE DRAWINGS

The present systems and methods for in-cabin hazard prevention and control for autonomous machine applications are described in detail below with reference to the attached drawing figures, wherein:

FIG. 10D is a system diagram for communication between cloud-based server(s) and the example autonomous vehicle of FIG. 10A, in accordance with some embodiments of the present disclosure.

DETAILED DESCRIPTION

Figure 1:
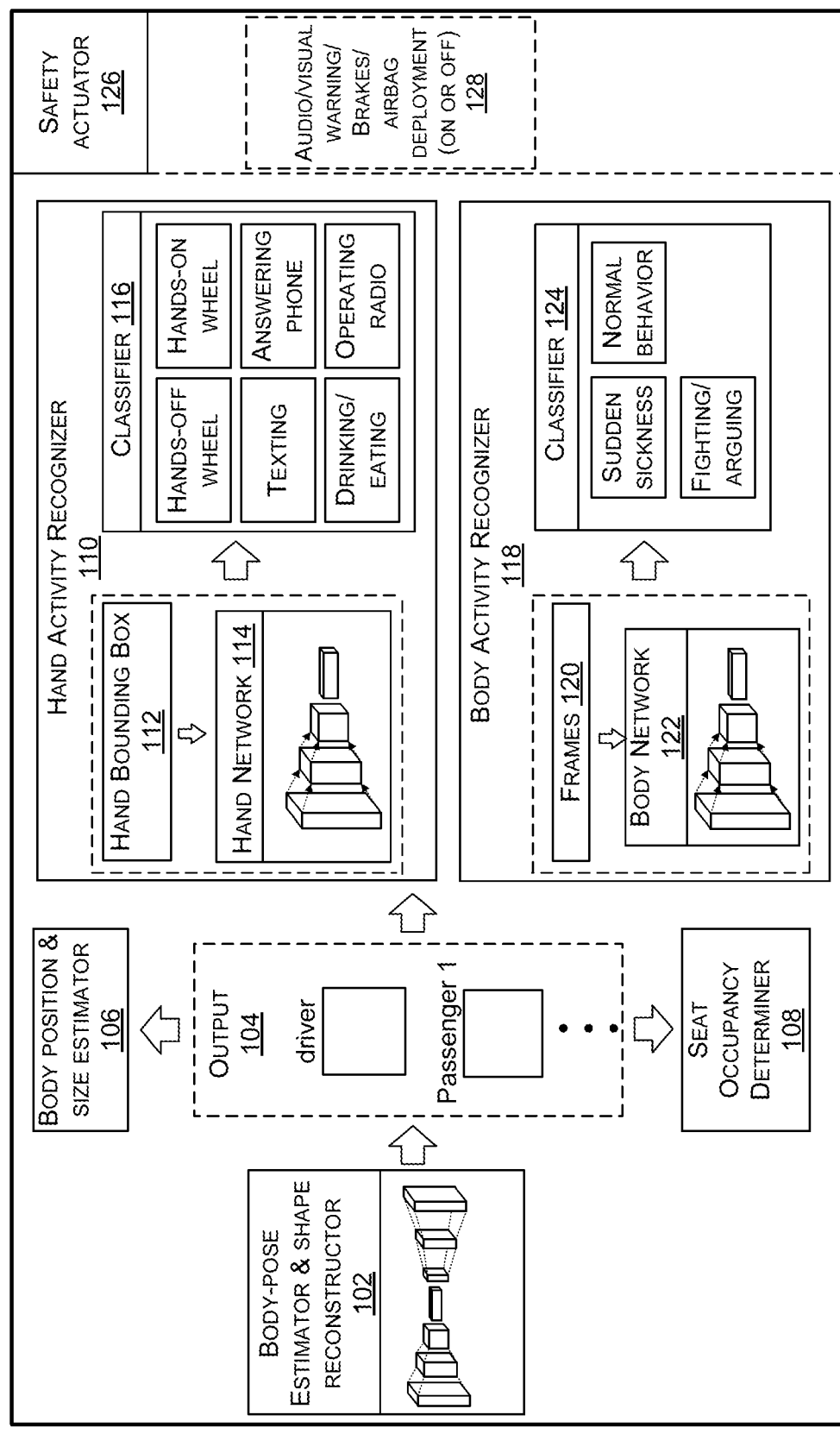
FIG. 1 is an example system for accurately identifying driver and passenger in-cabin activities that may indicate a biomechanical distraction that prevents a driver from being fully engaged in driving a vehicle, in accordance with some embodiments of the present disclosure.

Systems and methods are disclosed related to in-cabin hazard prevention and control for autonomous machine applications. Although the present disclosure may be described with respect to an example autonomous vehicle 1000 (alternatively referred to herein as "vehicle 1000" or "ego-vehicle 1000," an example of which is described with respect to FIGS. 10A-10D), this is not intended to be limiting. For example, the systems and methods described herein may be used by, without limitation, non-autonomous vehicles, semi-autonomous vehicles, warehouse vehicles, off-road vehicles, flying vessels, boats, shuttles, emergency response vehicles, motorcycles, electric or motorized bicycles, aircraft, construction vehicles, underwater craft, and/or other vehicle types. In addition, although the present disclosure may be described with respect to in-cabin activities of passengers, this is not intended to be limiting, and the systems and methods described herein may be used in augmented reality, virtual reality, security and surveillance, autonomous or semi-autonomous machine applications, and/or any other technology spaces where monitoring of persons may be implemented.

In particular, the current system is capable of accurately identifying driver and passenger in-cabin activities (e.g., based on body position, size of person, classification of gestures, etc.) that may indicate a biomechanical distraction that prevents a driver from being fully engaged in driving a vehicle. Based on identified in-cabin activities, the system may act accordingly by performing one or more actions (e.g., provide notifications, perform a safety maneuver, etc.). For instance, the system may adapt and/or respond to the identified in-cabin activities to address needs and/or requirements related to the driver or passengers based on an identified in-cabin activity. As an example, and based on the driver and/passenger in-cabin activities—determined at a more granular level, such as identifying specific hand gestures, body poses, body postures, occupancy maps, etc.— human-machine interactions may be adjusted and adapted to a current state of the occupants (e.g., by braking the vehicle, contacting emergency services, providing a visual, audible, and/or tactile warning notification, taking over control of the vehicle, surrendering control of the vehicle, etc.).

In some embodiments, the system may be used to estimate the availability of a driver to take over control of a vehicle (e.g., switch from autonomous to manual modes of operation). For instance, this estimation may be based on posture, body position, hand position or configuration, and/or activity associated with the driver. Using this information, the system may estimate how prepared the driver is to take over the vehicle. For example, this estimation may take place when the system determines that the vehicle is going to enter an area where autonomous control is not currently possible or allowed (e.g., due to lack of map information, federal, state, or local laws or regulations, an accident, crowds, traffic light outages, etc.).

In addition, the current system may leverage—instead of or in addition to weight and/or heat sensor information—a vision-based system to estimate body-size and position for air-bag control. In particular, information related to the body-size and/or position of a driver or passenger may be used to turn air-bag deployment on or off, and/or to adjust parameters of deployment of an air bag (e.g., with what force to deploy the air bag). For example, if a passenger is estimated to have a small body-size (e.g., a child), then air-bag deployment may be turned off. As another example, if the body position of the driver (e.g., position of driver's head) would be dangerous were an air-bag deployed from one or more positions, then air-bag deployment may be disabled temporarily at the corresponding positions.

Further, the current system may be used to recognize various driver and/or passenger activities (e.g., texting, talking on a phone, eating, drinking, operating a radio, etc.). For example, the current system may recognize whether a driver's hands are on or off the steering wheel. Determining the position of the driver's hands may be performed based on visual data alone. In addition, the system may be used to recognize when a driver loses consciousness or has abnormal movement or behavior such as a sudden sickness (e.g., epileptic seizure, anxiety attack, fainting spell etc.). In such cases, emergency services may be contacted to provide location information (e.g., using global navigation satellite system (GNSS) coordinates) for the vehicle. Further, sudden sickness detection, fighting or arguing, and/or other abnormal behavior may trigger an emergency safety maneuver for the vehicle (e.g., braking, moving the vehicle to the side of the road, coming to a complete stop, etc.). As mentioned, the system may be used to recognize (e.g., detect and characterize) interactions between the driver and the passengers (e.g., fighting, arguing, violent behavior towards each other, etc.), and such recognition may be used, for example, as a safety monitor in taxi services. In some embodiments, the system may determine when a manual takeover is intentional or unintentional. For example, if a driver is reading a book during manual takeover of the vehicle, the activation of manual takeover may be suppressed as the driver may not actually be ready to safely take over control.

With reference to FIG. 1, FIG. 1 is an example system 100 for accurately identifying driver and passenger in-cabin activities (e.g., based on body position, size of person, classification of gestures, etc.) that may indicate a biomechanical distraction that prevents a driver from being fully engaged in driving a vehicle, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

In particular, the systems of the present disclosure may monitor driver and passenger in-cabin activities in relation to in-cabin safety functions. For instance, the system may be used for in-cabin activity monitoring, such as, for example, phone usage, hands off-wheel, smoking, eating, drinking, etc. In addition, the system may be used for in-cabin health monitoring, such as, for example, sudden sickness. Further, the system may be used for in-cabin occupant monitoring, such as, for example, occupant detection and size estimation for air-bag deployment.

In more detail, the system may include one or more machine learning models and/or deep neural networks (DNNs)—such as convolutional neural networks (CNNs)— for processing sensor data (e.g., image data from one or more in-cabin cameras) to determine a pose, shape, position, size, hand activity, body activity, and/or other physical characteristics of occupants of the vehicle, and to determine one or more actions or procedures as a result of the determinations.

Figure 11:
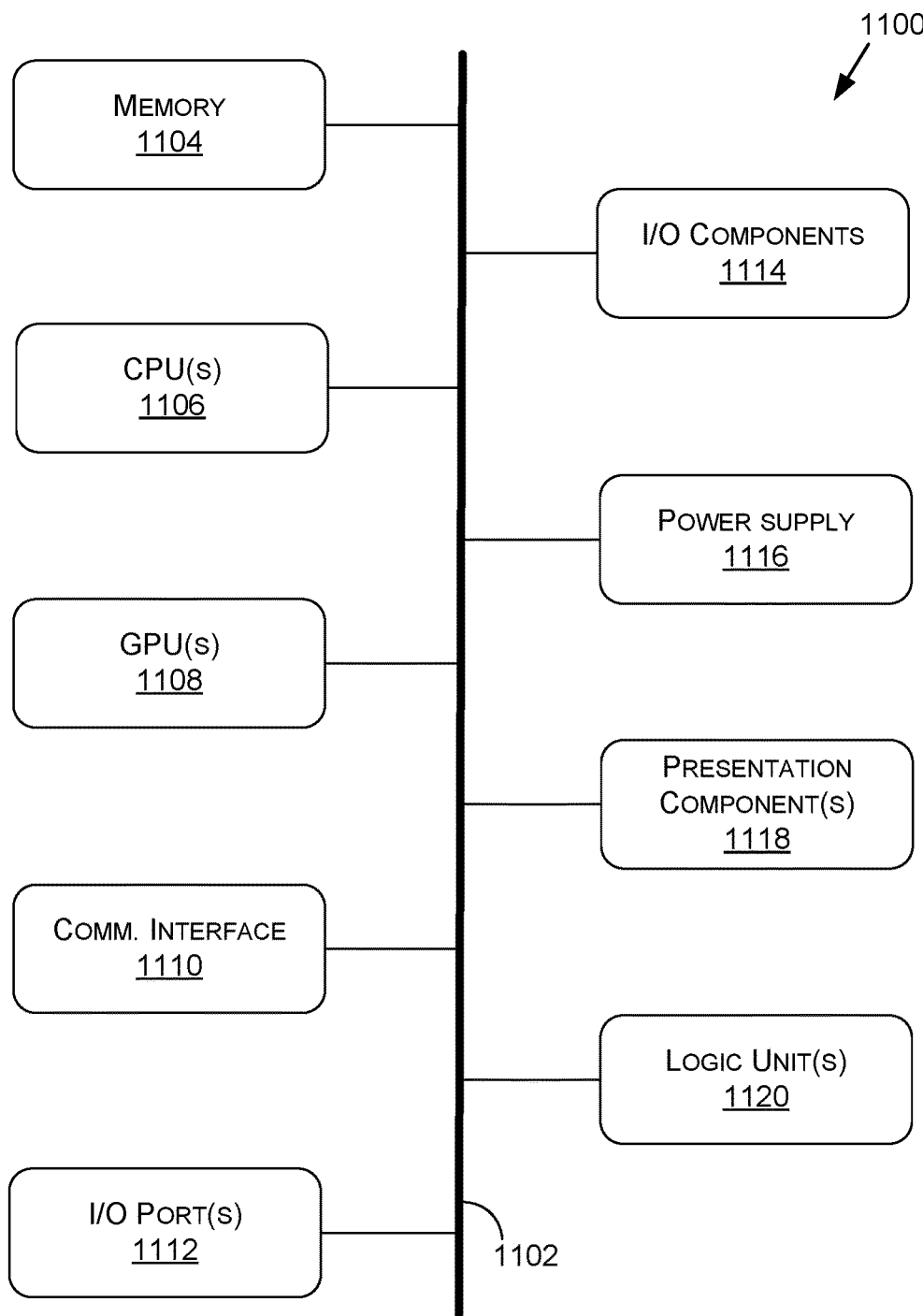
FIG. 11 is a block diagram of an example computing device suitable for use in implementing some embodiments of the present disclosure.

In some embodiments, operations executed by any of the various components of the system, such as determining at least one body pose and shape by a body pose estimator and shape reconstructor 102, estimating at least one body position and size by a body position and size estimator 106, determining seat occupancy by a seat occupancy determiner 108, recognizing one or more activities related to an occupant's hands by a hand activity recognizer 110, recognizing one or more activities related to pose variation of a body over time that are performed by an occupant by body activity recognizer 118, and/or carrying out one or more actions based on an identified activity by safety actuator 126, may be executed—e.g., in parallel—using one or more parallel processing units of the vehicle 1000, another object or vehicle, and/or by another device—such as a device including some or all of the components, features, and/or functionality of example computing device 1100 of FIG. 11).

The system 100 may comprise a body-pose estimator and shape reconstructor 102. The body-pose estimator and shape reconstructor 102 may use a body-pose and shape reconstruction network for processing sensor data to determine an estimated pose and shape of occupants of the vehicle. In some embodiments, the body-pose estimation and shape reconstruction network may include one or more DNN(s) with two or more branches or streams of layers—e.g., a first branch related to body-pose estimation and a second branch related to shape reconstruction. The DNN(s) may receive an input of raw and/or pre-processed images (e.g., of drivers and/or passengers inside a vehicle). As such, the DNN(s) may include two separate networks that disentangle the processing task into a pose estimation task and a non-rigid surface deformation (e.g., body shape) task. For example, the DNN(s) may receive image data representative of an image (e.g., a full frame containing the driver and any passengers) and process the image data through feature extraction layers to compute one or more feature or pose maps. Once the features maps are computed, a first branch of layers may process the features to generate a first output corresponding to a body-pose (e.g., including locations of key points of one or more occupants) and a second branch of layers may process the features to generate a second output corresponding to a shape of one or more occupants for shape reconstruction—e.g., to determine a volume of space, or a 4D capture in space-time, that the occupant(s) occupies within the cabin.

In some embodiments, the body-pose estimation output may estimate locations and/or angles of body key points (e.g., joints and/or key features), such as, for non-limiting examples, locations of wrists, elbows, shoulders, hips, knees, feet, neck, eyes, ears, nose, etc. These body key points may also be tagged with a label (e.g., the elbow body key point may be tagged "left elbow"). The detection and classification of key points may be used—e.g., by the DNN(s) and/or a post-processing algorithm—to connect the points according to an anatomical structure of a body, and the anatomical structure may be processed—e.g., by the DNN(s) and/or a post-processing algorithm—to estimate a body pose of the occupant(s). The shape reconstruction output may correspond to a reconstruction of the body key points by shape and volume (e.g., an estimated shape of the occupant(s) including clothing and apparel, in embodiments). This reconstruction may correspond to a non-rigid deformation (e.g., a space-time coherent non-rigid deformation) of a surface corresponding to the occupant(s).

In this way, the body-pose estimator and shape reconstructor 102 (e.g. using a body-pose estimation and shape reconstruction network) may simultaneously localize body key points for one or more occupants (e.g., driver and any passengers) in an in-cabin scene in an image space. In particular, the body-pose estimator and shape reconstructor 102 may generate 2D (e.g., (x,y)) or 3D (e.g., (x,y,z)) projections (e.g., estimated skeletal models or rigs) based on the estimated body key points. For instance, estimated skeletal models may be based on body-pose information (e.g. from the first branch of the network) and this information may be used to compute a shape—or non-rigid deformations of a model surface—such that current activities, postures, and/or gestures of occupants can be monitored and acted upon by the system.

During training, the body-pose estimation and shape reconstruction network may undergo (in example, non-limiting embodiments) weakly supervised training based on multi-view supervision (e.g., images from two or more cameras within the vehicle)—thereby removing a need for training data with 3D ground truth annotations (a compute and time intensive task). For example, the DNN(s) may be trained from multi-view video footage (e.g., multi-view input images 202 of FIG. 2) directly due to the differentiable representations of deforming human surfaces described herein. For example, during training, the body-pose estimation and shape reconstruction network may receive inputs of the multi-view images and may generate an output(s) 104. The outputs 104 may correspond to estimated rigs (e.g., 3D pose based on the estimated body key points), and loss in the network can then be applied on each reconstructed pose based on the estimated rigs. For instance, each of the estimated rigs should align with each other even though they are from different views and perspectives and, in this way, alignment error may be used as a weight adjustment to correct for the loss in the network. This allows for training the network to generate—in deployment—one final 3D estimated rig from a monocular image.

Figure 2:
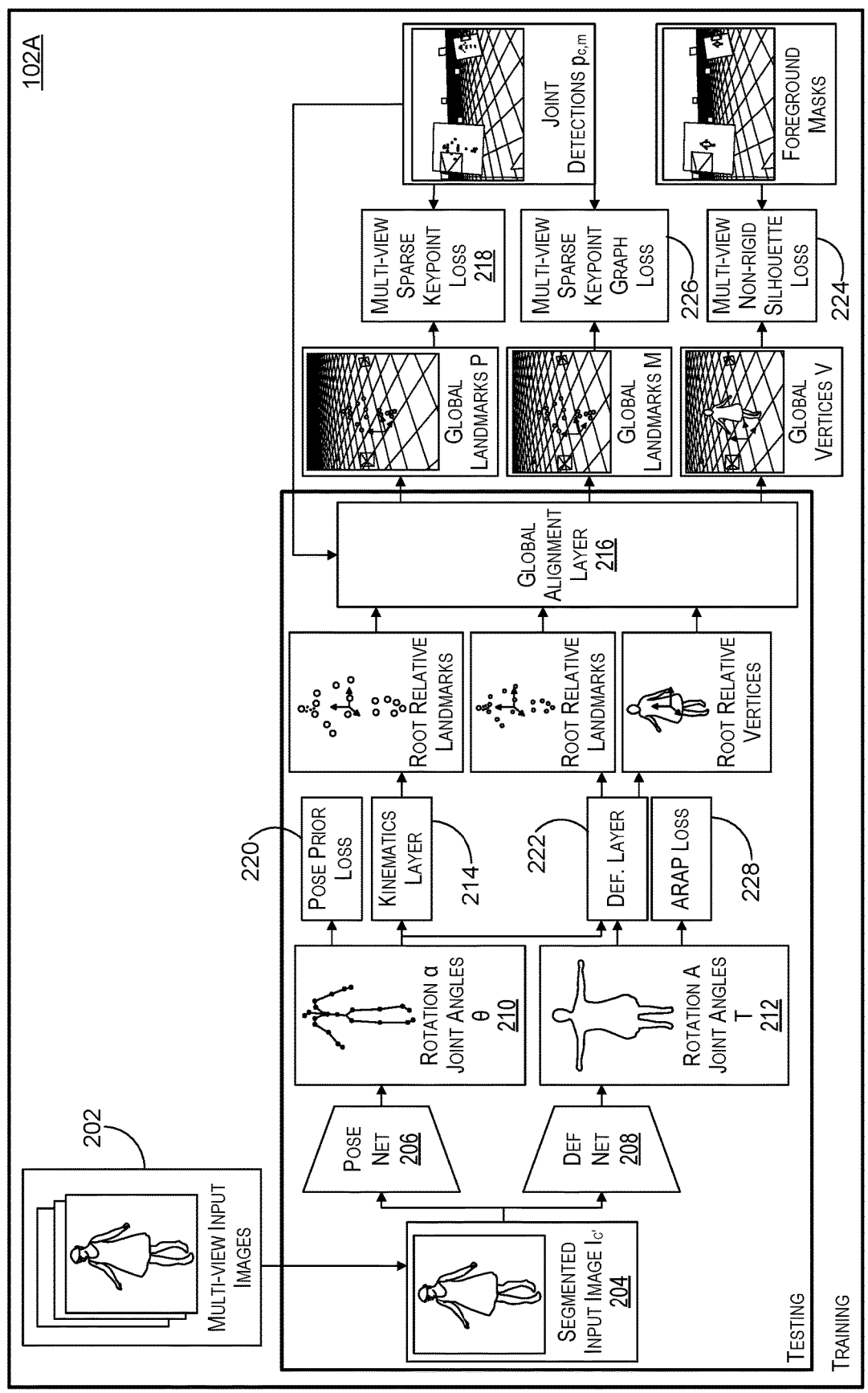
FIG. 2 depicts example process for identifying a body activity, in accordance with some embodiments of the present disclosure.

An example of such a body-pose and shape reconstruction network is illustrated in FIG. 2, in accordance with some embodiments of the present disclosure. For example, a segmented image 204 may be provided as input during deployment, and a first DNN, PoseNet 206, may be trained to predict outputs 210 of joint angles and camera relative rotation using sparse multi-view 2D joint detections as weak supervision. A second DNN, DefNet 208, may receive the segmented image 204 as input and regress on outputs 212 corresponding to embedded graph rotation and translation parameters to account for non-rigid deformations. To train DefNet 208, multi-view 2d joint detections and silhouettes may be used for supervision.

In some embodiments, with respect to PoseNet 206, kinematic layer 214 may be implemented as a differentiable function that takes joint angles and the camera relative rotation and computes positions of the 3D landmarks (or key points) attached to a rig (e.g., 17 body joints and 4 face landmarks). A global alignment layer 216, which may be attached to the kinematics layer 214, may be used to obtain a global translation. For example, the global alignment layer 216 may localize the rig in world space, such that globally rotated landmarks project onto the corresponding detections in all camera views.

Various types of loss functions may be used to train PoseNet 206. For example, sparse keypoint loss 218 may be used for PoseNet 206 to ensure that each landmark or key point projects onto the corresponding 2D joint detections in all camera views. Pose prior loss 220 may be used to avoid unnatural poses on the joint angles such that each joint angle stays in a range depending on the anatomic constraints.

With respect to DefNet 208 (e.g., deformation network), and because PoseNet 206 alone may not account for the non-rigid deformation of the skin and clothes, DefNet 208 may disentangle regress the non-rigid deformation parameterized with rotation angles and translation vectors of the nodes of the embedded deformation graph—thereby disentangling the non-rigid deformations and the articulated skeletal motion from PoseNet 206. DefNet 208 may implement a deformation layer 222 with differentiable rendering using multi-view silhouette-based weak supervision. For example, the deformation layer 222 may take the rotation angles and translation vectors as input to non-rigidly deform the surface. In some embodiments, the skeletal pose may applied on deformed mesh vertices to obtain vertex positions in input camera space. The outputs of the deformation layer 222 may be rotated relative to the camera and located around an origin and, to bring them to global space, an inverse camera rotation and global translation may be applied by the global alignment layer 216.

Various loss functions may be used to train DefNet 208. For example, non-rigid silhouette loss 224 may be used to encourage that the non-rigidly deformed mesh matches the multi-view silhouettes in all camera views. In addition, this loss 224 may ensure that the boundary vertices project onto the zero-set of the distance transform—e.g., the foreground silhouette. Only using the non-rigid silhouette loss 224 may lead to wrong mesh-to-image assignments, especially for highly articulated motions. As such, sparse key point graph loss 226 may be used to constrain the mesh deformation. In some embodiments, as-rigid-as-possible (ARAP) loss 228 may be used to enforce local smoothness of the surface. For example, weights may be applied such that the mesh can deform more or less depending on the surface material. As such, graph nodes that are mostly connected to vertices of a skirt may deform more freely than nodes that are mainly connected to vertices on skin.

Referring again to FIG. 1, the system 100 may further include a body position and size estimator 106. The body position and size estimator 106 may use information output by the body-pose estimator and shape reconstructor 102 (e.g., output 104) to estimate a body size and/or position. This estimated body size and/or position may be used to make determinations such as whether a body pose is normal, whether a driver or passenger is in a position where airbags may safely be deployed, whether a driver or passenger is a size where airbags may safely be deployed (e.g., child vs. adult), seat occupancy in a vehicle, etc. For example, information related to the body-size and/or position of a driver or passenger may be used to turn air-bag deployment on or off.

In embodiments, an estimated body pose can be analyzed to determine whether the body pose is normal. In embodiments, a body position network (e.g., a DNN(s)) may be used that is trained to identify when a body is in position or out of position. For instance, the body position network can learn various normal body poses (e.g., sitting, eating, looking around, etc.). As an example, an encoder of the network may learn representations of normal positions. Upon completion of training, the body position network can be used to analyze the position of drivers and/or passengers in a vehicle. The input into such a body position network may be the body pose from a body-pose estimation and shape reconstruction network of the body-pose estimator and shape reconstructor 102 (e.g., a rig based on body key points). From this input, the body position network can use reconstruction error to determine if the body position is abnormal. For example, when reconstruction error is very high, this indicates that the body position network has not seen the body position before. From this high reconstruction error, the body position may be classified as abnormal. In this way, reconstruction error may be used to determine whether a position of a driver or passenger is abnormal or normal.

In addition, an estimated body pose can be analyzed to determine a body-size of a driver and/or passengers. For instance, to determine a body-size of the driver and/or passengers, a shape given a volume of the person may be used. Information related to the body-size of a driver or passenger may be used to turn air-bag deployment on or off. For example, if a passenger is estimated to have a small body-size (e.g., a child), then air-bag deployment may be temporarily disabled.

Further, the system 100 may include a seat occupancy determiner 108. The seat occupancy determiner 108 may use information output by the body-pose estimator and shape reconstructor 102 (e.g., output 104) to estimate occupancy within a vehicle. For example, an estimated body pose can be analyzed to determine vehicle occupancy. In particular, estimated body pose(s) for drivers and/or passengers (e.g., a rig(s)) may be used to help estimate the occupancy within a vehicle. For instance, occupancy of each seat in the vehicle may be estimated based on a comparison between predetermined locations of seats within a vehicle (e.g., based on the image space) in relation to the estimated rig(s). Seat occupancy may be used, for example, to enable features within a vehicle (e.g., check seatbelts for occupied seats, activate interactive features for occupied seats, etc.).

In addition, the system 100 may include a hand activity recognizer 110. The hand activity recognizer 110 may use hand bounding boxes 112 to normalize the position of a hand in an image (e.g., by centering a bounding box on the hand). In some embodiments, the hand activity recognition network 114 and classifier 116 may use information output by the body-pose estimator and shape reconstructor 102 (e.g., output 104) to determine a portion (e.g., within the bounding boxes 112) of image data that corresponds to hands of an occupant. The hand activity recognizer 110 may also include a hand recognition network 114 and a classifier 116 (e.g., a DNN(s)). For instance, the hand activity recognition network 114 and classifier 116 may check whether a driver is engaged in one or more distracting activities. In particular, the hand activity recognition network 114 and classifier 116 may use body-pose and shape to determine activities performed by the driver that relate to the driver's hands (e.g., texting, hands on/off wheel, drinking or eating, etc.).

The input into the hand activity recognition network 114 may be a cropped portion of an image (e.g., the image provided as input to the body-pose estimator and shape reconstructor 102) that is within the hand bounding box 112. The hand bounding box image may normalize the position of a hand by centering the bounding box on the hand. The crop of the image for the hand bounding box can be estimated based on a wrist position (e.g., from the body-pose estimation and shape reconstruction network). In particular, the direction of the elbow and/or wrist body key points may be used to estimate the placement of the bounding box. Using such information, the hand key point may be centered in the hand bounding box. In some embodiments, the hand bounding box 112 may also use body key point labels (e.g., center the left hand in a left hand bounding box when a right hand is also visible in the crop). Based on the limb line (e.g., between the elbow and wrist body key points, between the neck and torso, and/or between the shoulder and elbow), the bounding box may be scaled. As such, the hand bounding box(es) input into the hand activity recognition network may all be of the same dimensionality—e.g., when a bounding box has a different size, the hand bounding box may be manipulated to this predefined size.

The hand activity recognition network 114 may receive an input of a hand bounding box for each hand (e.g., right hand bounding box and left hand bounding box). The same network may be used for both the right and left hand bounding boxes. The hand activity recognition network 114 may be used to output confidences for various classes in relation to a hand. For instance, the confidence can indicate the likelihood that the hand is performing a particular activity. Such activities may include texting, answering the phone, drinking or eating, operating the radio, hands on the steering wheel, hands off the steering wheel, etc. To determine the confidences for the various classes, one or more classifiers (e.g. via classifier 116) may be used. The classified activities for the right and left hand may undergo further analysis, such as, for example, a priority may be associated with different activities such that when the right and left hand are classified as performing two different activities, one activity may be prioritized when determining some action to perform. In one example, when the right hand is classified as "on wheel" and the left hand is classified as "off wheel," the "on wheel" classification may be prioritized such that the system does not perform any action. In a different example, when the right hand is classified as "on wheel" and the left hand is classified as "texting," the "texting" classification may be prioritized such that the system issues an alert that texting must cease before manual control of the vehicle can be initiated.

Figure 4:
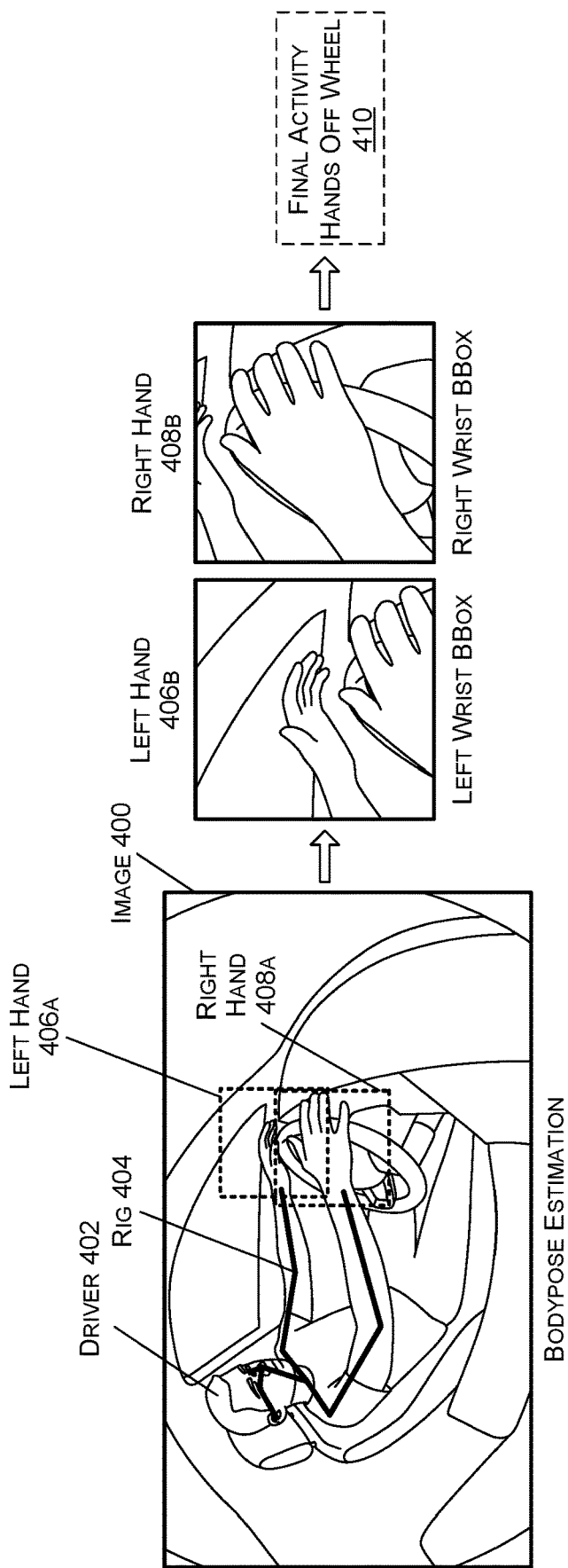
FIG. 4 depicts a visual representation of determining activities performed by a driver that relate to the driver's hands, in accordance with some embodiments of the present disclosure.

As an example and with reference to FIG. 4, FIG. 4 depicts a visual representation of determining activities performed by a driver that relate to the driver's hands (e.g., texting, hands on/off wheel, drinking or eating, etc.), in accordance with some embodiments of the present disclosure. In particular, FIG. 4 depicts driver 402 with a corresponding rig 404. Corresponding rig 404 may comprise information such as body-pose and shape (e.g., as output by the body-pose estimation and shape reconstruction network of the body-pose estimator and shape reconstructor 102). In particular, information such as body-pose and shape may include locations and/or angles of body key points (e.g., joints and/or key features). From the information, hand bounding box images (e.g., left hand image 406b and right hand image 408b) may be determined. For instance, a hand bounding box image (e.g., left hand image 406b and right hand image 408b) may be a crop of an image 400 around the hands of a driver (e.g., left hand 406a and right hand 408a). The crop of the image 400 for a hand bounding box may be estimated based on a wrist position (e.g., from rig 404). In particular, the direction of the elbow and wrist body key points from rig 404 may be used to estimate the placement of the bounding box (e.g., left hand 406a and right hand 408a). As depicted, such information may be used such that the hand key point may be centered in the hand bounding box. In some embodiments, body key point labels from rig 404 may also be used (e.g., center the left hand in left hand bounding box 406b when a right hand is also visible in the crop).

Such generation of left hand image 406b and right hand image 408b may be performed using, for example, the hand activity recognizer 110. In particular, the hand bounding box 112 may be used to generate left hand image 406b and right hand image 408b from image 400. In addition, left hand image 406b and right hand image 408b may be provided as input to the hand activity recognition network (e.g., hand recognition network 114 and a classifier 116). Based on an analysis of the left hand image 406b and the right hand image 408b, one or more activities may be determined (e.g., using the classifier 116). For instance, as depicted in FIG. 4, left hand 406b may be classified as "off wheel" and right hand 406b may be classified as "off wheel." In this way, final activity 410 may be determined as hands "off wheel."

Figure 5A:
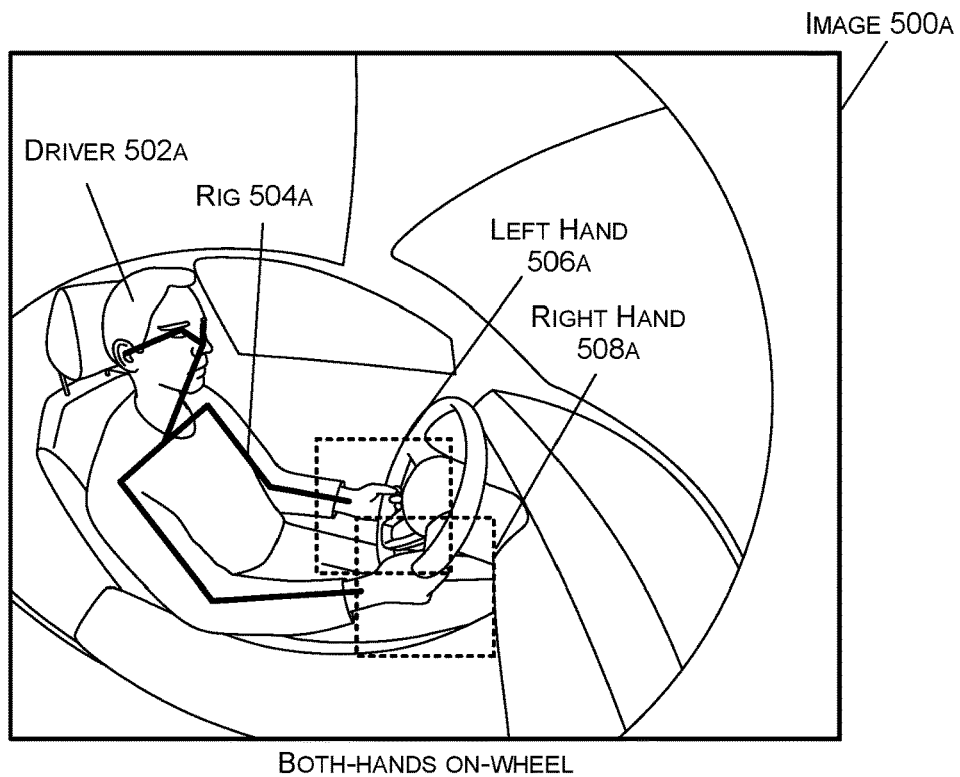
FIGS. 5A-5F depict visual representations of determining activities performed by a driver that relate to the driver's hands, in accordance with some embodiments of the present disclosure.

Referring now to FIGS. 5A-5F, FIGS. 5A-5F depict visual representations of determining activities performed by a driver that relate to the driver's hands (e.g., texting, hands on/off wheel, drinking or eating, etc.), in accordance with some embodiments of the present disclosure. In particular, FIG. 5A depicts driver 502a with a corresponding rig 504a overlaid on image 500a. Information related to rig 504a may be used to determine an activity associated with left hand 506a and right hand 508a. For instance, the hand activity recognizer 110 may be used to determine an activity associated with left hand 506a and right hand 508a. As depicted in FIG. 5A the activity associated with left hand 506a is "on wheel" and the activity associated with right hand 508a is "on wheel."

Figure 5B:
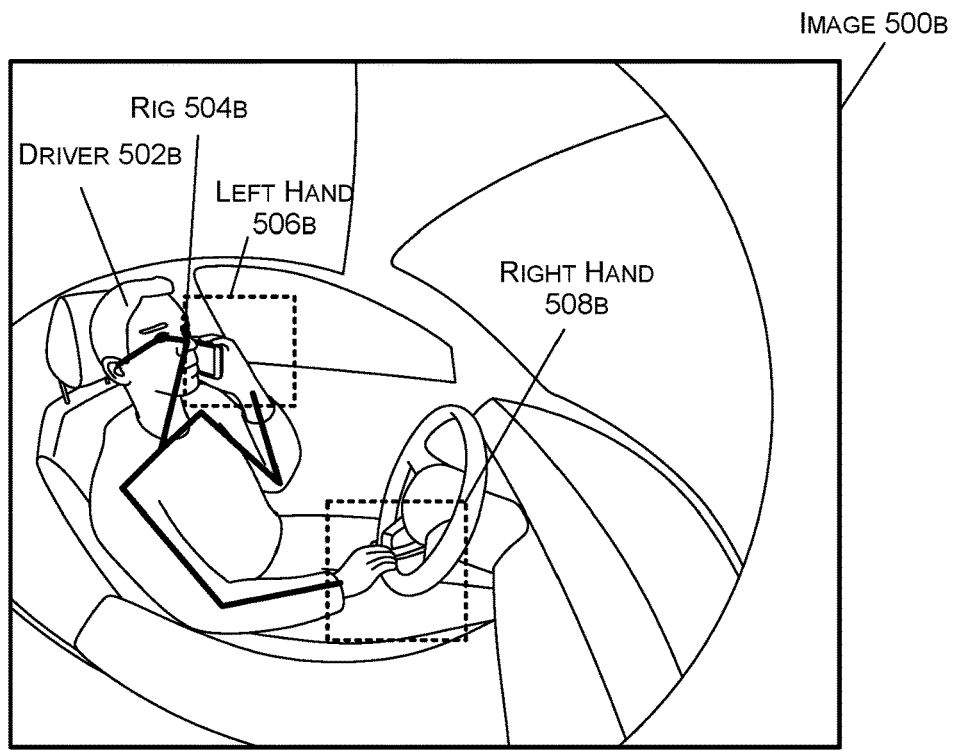

FIG. 5B depicts driver 502b with a corresponding rig 504b overlaid on image 500b. Information related to rig 504b may be used to determine an activity associated with left hand 506b and right hand 508b. For instance, the hand activity recognizer 110 may be used to determine an activity associated with left hand 506b and right hand 508b. As depicted in FIG. 5B the activity associated with left hand 506b is "on phone" and the activity associated with right hand 508b is "on wheel." These activities for the left hand 506b and right hand 508b may undergo further analysis, such as, for example, a priority may be associated with different activities such that when the right and left hand are classified as performing two different activities, one activity may be prioritized when determining some action to perform. For instance, as depicted in FIG. 5B, when the left hand 506b is classified as "on phone" and the right hand is classified as "on wheel," the "on phone" activity may be prioritized. Based on this activity, the system may issue an alert that talking on the phone must cease before manual control of the vehicle can be initiated.

Figure 5C:
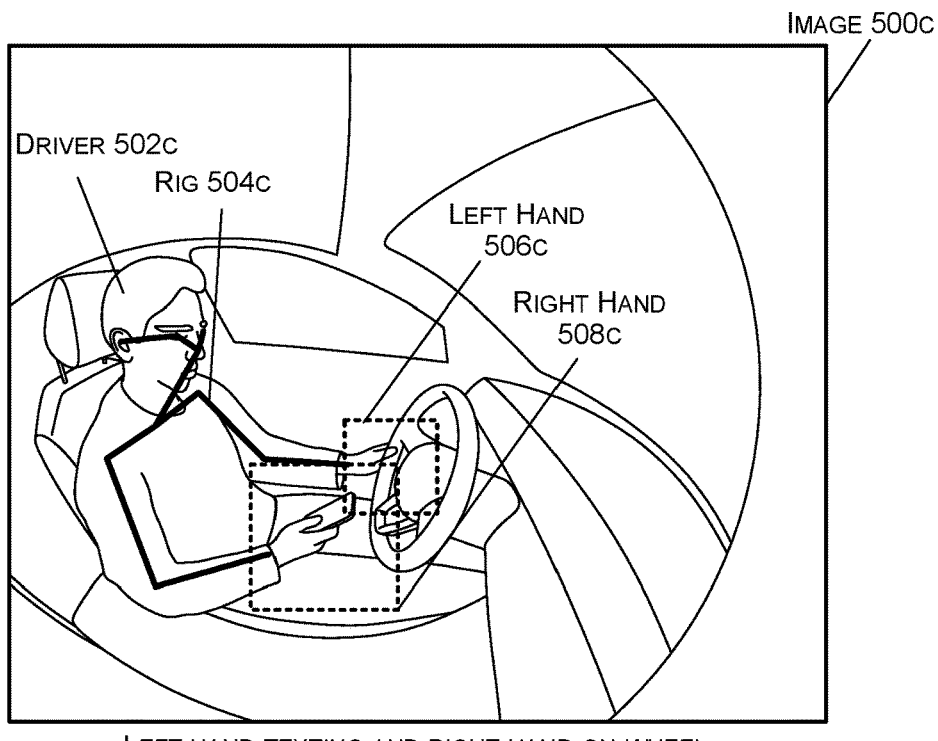

FIG. 5C depicts driver 502c with a corresponding rig 504c overlaid on image 500c. Information related to rig 504c may be used to determine an activity associated with left hand 506c and right hand 508c. For instance, the hand activity recognizer 110 may be used to determine an activity associated with left hand 506c and right hand 508c. As depicted in FIG. 5C the activity associated with left hand 506c is "on wheel" and the activity associated with right hand 508c is "texting." These activities for the left hand 506c and right hand 508c may undergo further analysis, such as, for example, when the left hand 506c is classified as "on wheel" and the right hand is classified as "texting," the "texting" activity may be prioritized. Based on this activity, the system may issue an alert that texting must cease before manual control of the vehicle can be initiated.

Figure 5D:
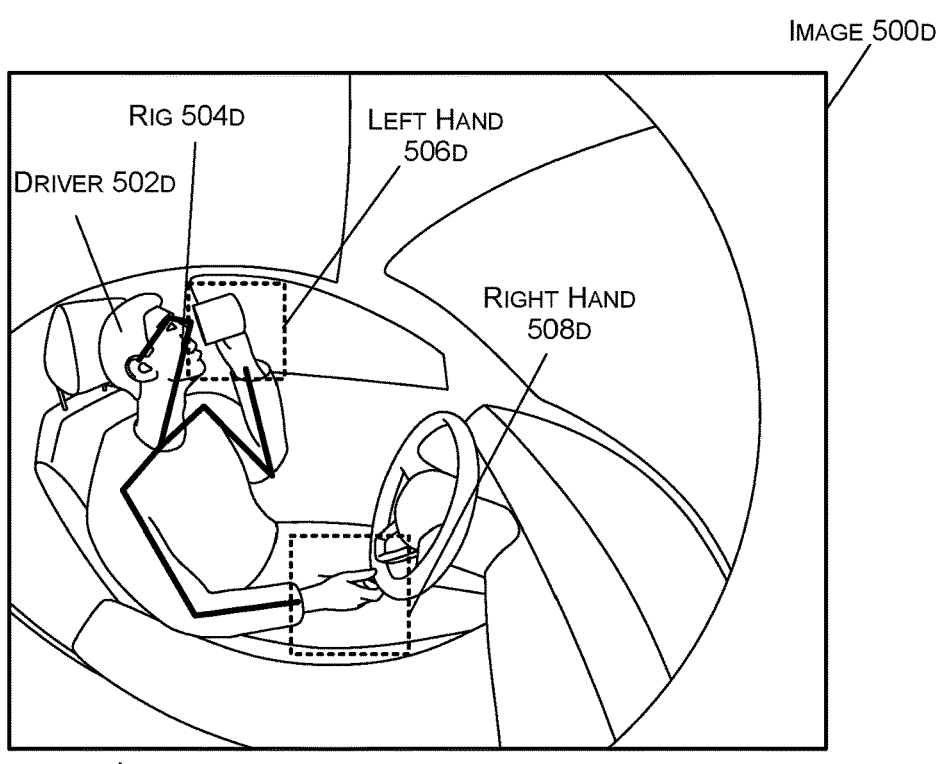

FIG. 5D depicts driver 502d with a corresponding rig 504d overlaid on image 500d. Information related to rig 504d may be used to determine an activity associated with left hand 506d and right hand 508d. For instance, the hand activity recognizer 110 may be used to determine an activity associated with left hand 506d and right hand 508d. As depicted in FIG. 5D the activity associated with left hand 506d is "drinking" and the activity associated with right hand 508d is "on wheel." These activities for the left hand 506d and right hand 508d may undergo further analysis, such as, for example, when the left hand 506d is classified as "drinking" and the right hand is classified as "on wheel," the "drinking" activity may be prioritized. Based on this activity, the system may issue an alert that drinking must cease before manual control of the vehicle can be initiated.

Figure 5E:
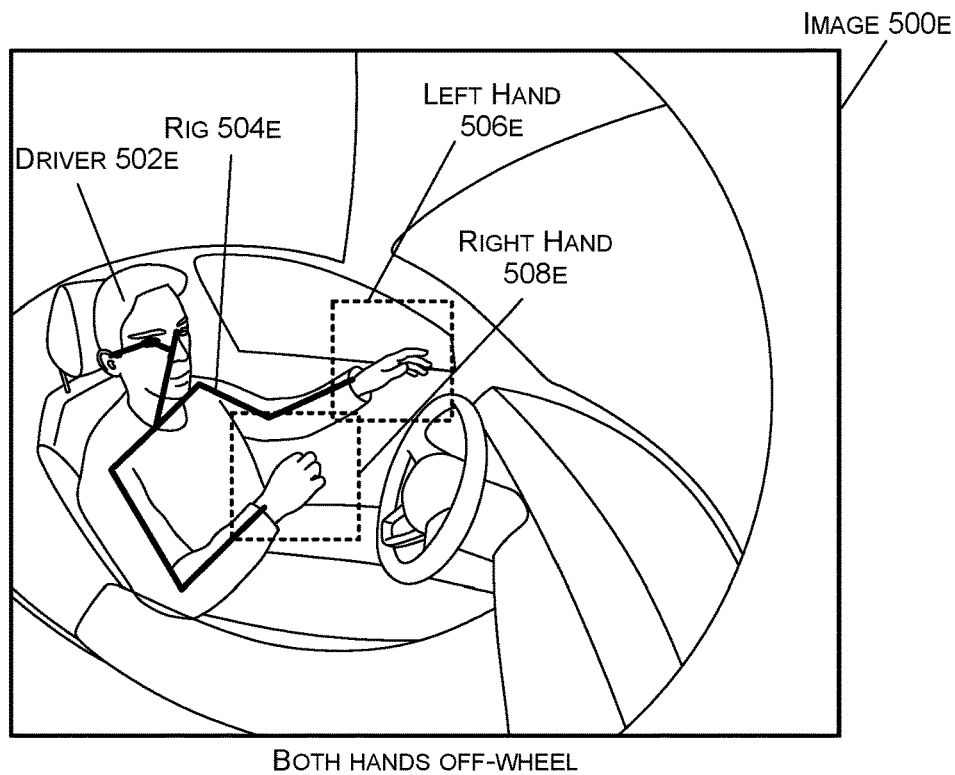

FIG. 5E depicts driver 502e with a corresponding rig 504e overlaid on image 500e. Information related to rig 504e may be used to determine an activity associated with left hand 506e and right hand 508e. For instance, the hand activity recognizer 110 may be used to determine an activity associated with left hand 506e and right hand 508e. As depicted in FIG. 5E the activity associated with left hand 506e is "off wheel" and the activity associated with right hand 508e is "off wheel." Based on both hands being "off wheel," the system may issue an alert for driver 502e to place hands on the wheel before manual control of the vehicle can be initiated.

Figure 5F:
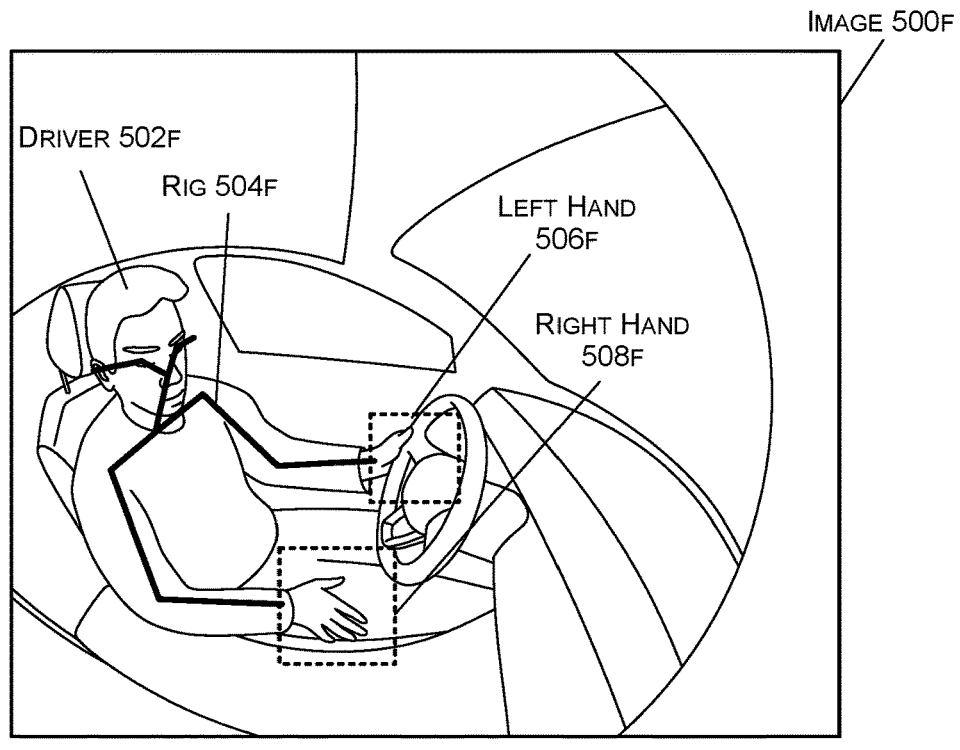

FIG. 5F depicts driver 502f with a corresponding rig 504f overlaid on image 500f. Information related to rig 504f may be used to determine an activity associated with left hand 506f and right hand 508f. For instance, the hand activity recognizer 110 may be used to determine an activity associated with left hand 506f and right hand 508f. As depicted in FIG. 5F the activity associated with left hand 506f is "on wheel" and the activity associated with right hand 508f is "off wheel." These activities for the left hand 506f and right hand 508f may undergo further analysis, such as, for example, when the left hand 506d is classified as "on wheel" and the right hand is classified as "off wheel," the "on wheel" activity may be prioritized—and no action may be taken, or handing control back to a driver may be enabled so long as "on wheel" is the prioritized determination.

With reference again to FIG. 1, the system 100 may further comprise a body activity recognizer 118. The body activity recognizer 118 may include frames 120 that may be used to receive an input of a set of frames (e.g., representative of a video with both temporal and spatial information related to body key points). The body activity recognizer 118 may also include a body activity recognition network 122 and classifier 124 (e.g., a DNN(s)). In some embodiments, the body activity recognition network 122 and classifier 124 may use information output by the body-pose estimator and shape reconstructor 102 (e.g., output 104). For instance, the body activity recognition network 122 and classifier 124 may check whether a driver and/or passenger is engaged in one or more distracting activities. In particular, the body activity recognition network 122 and classifier 124 may use body-pose and shape to determine activities that are related to pose variation of the body over time that are performed by the driver and/or passengers. For instance, such body activities may include sudden sickness or fainting, fighting or aggressive behavior, normal behavior, etc.

The body activity recognition network 122 may receive an input of skeletal reconstructions or body pose features corresponding to a set of frames 120 (e.g., representative of a video with both temporal and spatial information related to body key points). In analyzing this data corresponding to a set of frames, the body activity recognition network 122 may analyze the body of a driver and/or passenger over time. For instance, the position of a driver's body bending over for multiple frames (e.g., over time) may indicate sudden sickness. In particular, the network may receive body key points for each occupant in a vehicle over a time-window comprising the set of frames (e.g., T frames). Based on the classification of body posture and motion patterns during the set of frames, the body activity recognition network 122 may classify one or more activities.

The body activity recognition network 122 may be used to output confidences for various classes in relation to the one or more activities. For instance, the confidence can indicate the likelihood that a driver and/or passenger is performing a particular activity. Such activities may include sudden sickness or fainting, fighting or aggressive behavior, normal behavior, etc. To determine the confidences for the various activities, one or more classifiers may be used.

Figure 3:
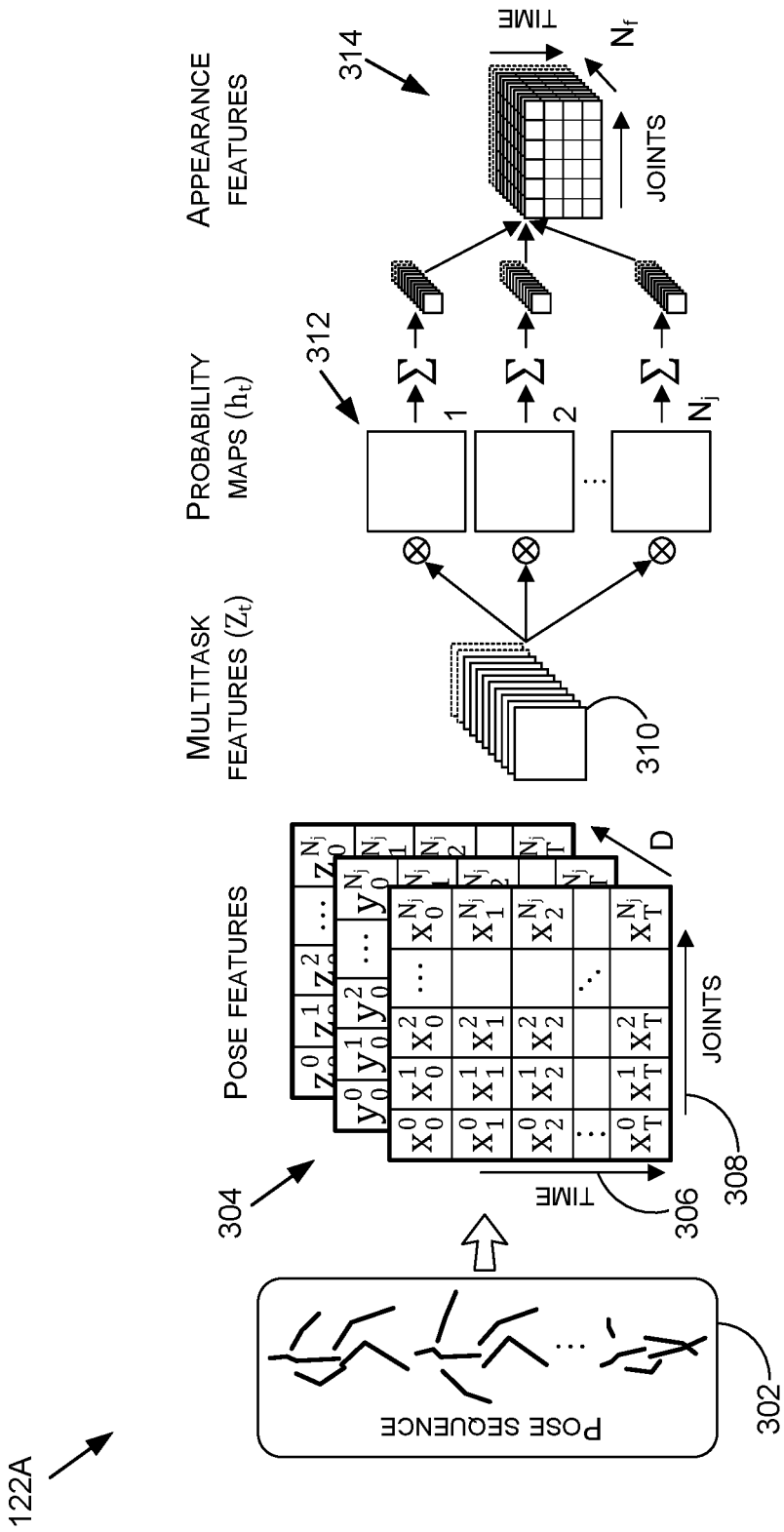
FIG. 3 depicts an illustration of a body-pose and shape reconstruction network, in accordance with some embodiments of the present disclosure.

An example process for identifying a body activity is illustrated in FIG. 3, in accordance with some embodiments of the present disclosure. Body Network 122A may correspond to one example architecture for body network 122 of FIG. 1. For example, a sequence of poses 302 each having some number of key points may be converted into an image-like representation 304. For instance, to determine pose information for use in identifying a body activity, a temporal dimension 306 may be encoded as a vertical axis while key body points (e.g., joints) 308 may be encoded as a horizontal axis. Using this information, coordinates of each point, for instance, (x,y) for 2D or (x,y,z) for 3D may be used as channels. 2D convolutions 310 may then be used to extract patterns from the temporal sequence of key body points (e.g., joints). In addition, localized visual information may be encoded as appearance features. These appearance features may be extracted by multiplying each channel from a tensor of multi-task features by each channel from probability maps 312 (e.g., learned as a byproduct of the pose estimation process). The spatial dimension may then be collapsed using a sum to result in an appearance feature for a time, and appearance features maps for a sequence of frames may be concatenated to generate a video clip of appearance features 314.

Figure 6A:
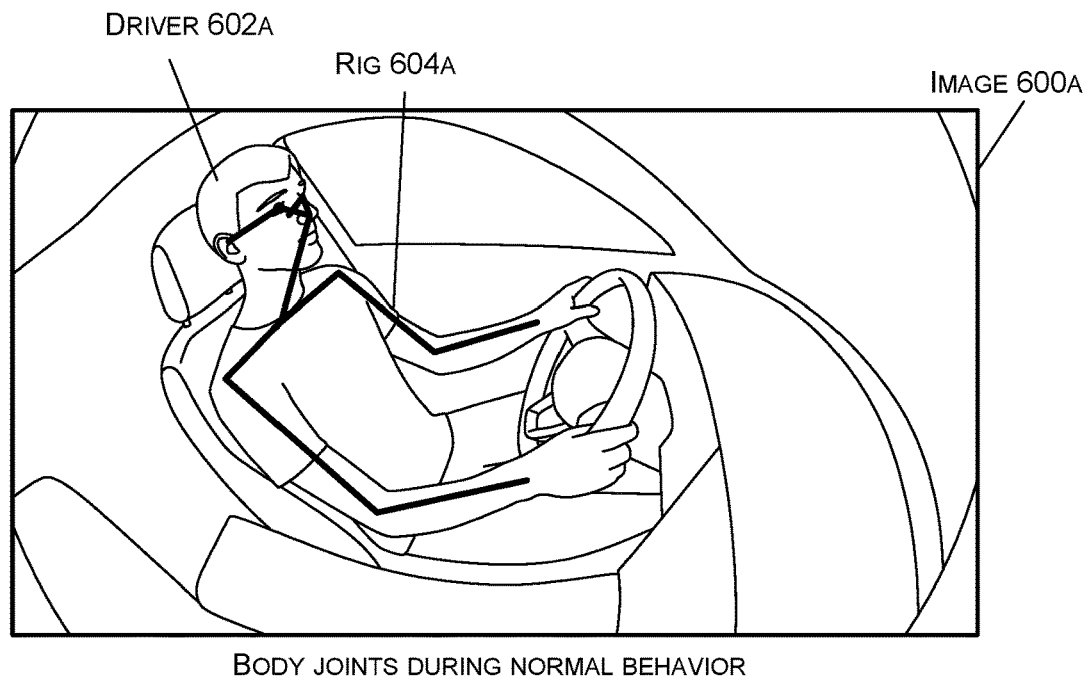
FIGS. 6A-6B depict visual representations of determining activities performed by a driver that relate to the driver's body, in accordance with some embodiments of the present disclosure.
Figure 6B:
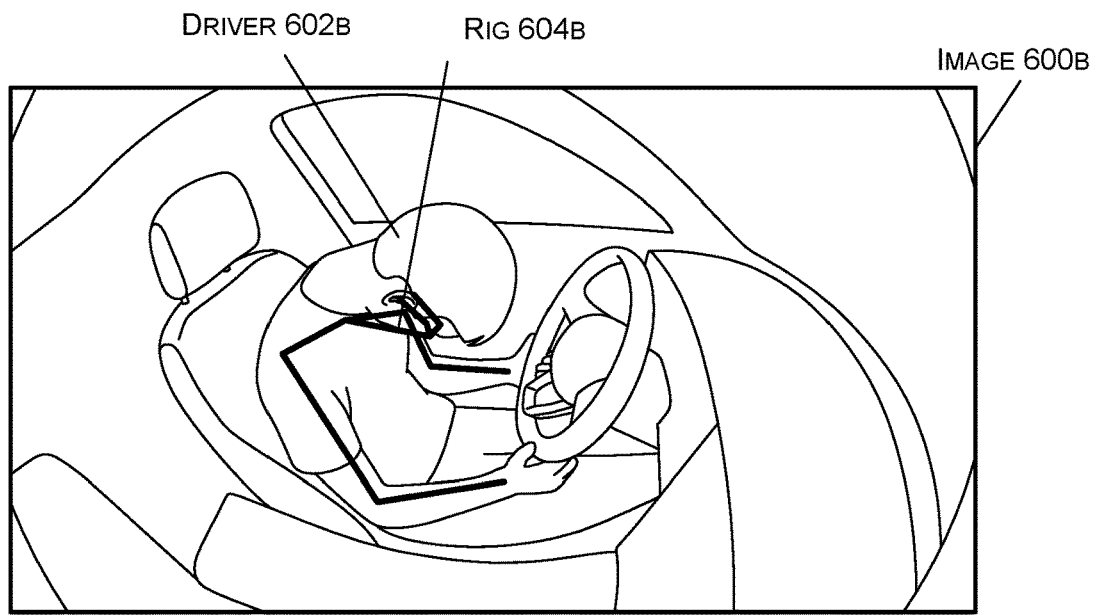

Referring now to FIGS. 6A-6B, FIGS. 6A-6B depict visual representations of determining activities performed by a driver that relate to the driver's body (e.g., sudden sickness or fainting, fighting or aggressive behavior, normal behavior, etc.), in accordance with some embodiments of the present disclosure. In particular, FIG. 6A depicts driver 602a with a corresponding rig 604a overlaid on image 600a. Rig 604a may comprise information such as body-pose and shape (e.g., as output by the body-pose estimation and shape reconstruction network of the body-pose estimator and shape reconstructor 102). In particular, information such as body-pose and shape may include locations and/or angles of body key points (e.g., joints and/or key features). In addition, image 600a may be representative of a frame in a set of frames (e.g., representative of a video with both temporal and spatial information related to body key points).

In embodiments, to determine an activity performed by driver 602a, the body activity recognizer 118 may be used to analyze image 600a— or a rig determined therefrom— that may correspond to a frame from a set of frames. In particular, the body activity recognition network 122 and classifier 124 of the body activity recognizer 118 may use rig 604a to check whether driver 604a is engaged in one or more distracting activities. For instance, the body activity recognition network 122 and classifier 124 may use rig 604a to determine activities that are related to pose variation of the driver 604a over time. For instance, as depicted in image 600a, the driver 604a is performing the activity "normal behavior."

FIG. 6B depicts driver 602b with a corresponding rig 604b overlaid on image 600b. The body activity recognition network 122 and classifier 124 of the body activity recognizer 118 may use rig 604b (in addition to one or more rigs from other frames in a set of frames) to check whether driver 604b is engaged in one or more distracting activities. For instance, the body activity recognition network 122 and classifier 124 may use rig 604b to determine activities that are related to pose variation of the driver 604b over time. For instance, as depicted in image 600b, the driver 604b is performing an activity indicative of "sudden sickness." Based on the determined "sudden sickness" activity, the system may issue an alert (e.g., call emergency services) and/trigger an emergency safety maneuver for the vehicle (e.g., braking, moving the vehicle to the side of the road, coming to a complete stop, etc.).

With reference to FIG. 1, the system 100 may include a safety actuator 126 that may be used to send audio and/or visual notifications based on an identified activity in the vehicle (e.g., hands on wheel reminder), and/or to aid in control or actuation decisions (e.g., to activate or deactivate autonomous driving, to execute a safety procedure, etc.). In addition, the safety actuator 126 may carry out one or more actions 128 based on an identified activity in the vehicle (e.g., contacting emergency services when sudden sickness detected, deactivating air-bags based on body position or size, etc.). In some embodiments, audio notifications may be customized based on a level of driver disengagement related to a particular activity. For instance, such audio notifications may relate to activities such as distracted driver notifications for as texting, answering a phone, reading, etc.

Although examples are described herein with respect to using DNNs, and specifically convolutional neural networks (CNNs), as the body-pose estimator and shape reconstructor 102, the hand network 114, and the body network 122, this is not intended to be limiting. For example, and without limitation, the DNNs may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvolutional, generative adversarial, liquid state machine, etc.), areas of interest detection algorithms, computer vision algorithms, and/or other types of machine learning models.

As an example, such as where the DNNs include a CNN, the DNNs may include any number of layers. One or more of the layers may include an input layer. The input layer may hold values associated with the sensor data (e.g., before or after post-processing). For example, when the sensor data is an image, the input layer may hold values representative of the raw pixel values of the image(s) as a volume (e.g., a width, a height, and color channels (e.g., RGB), such as 32×32×3).

One or more layers may include convolutional layers. The convolutional layers may compute the output of neurons that are connected to local regions in an input layer, each neuron computing a dot product between their weights and a small region they are connected to in the input volume. A result of the convolutional layers may be another volume, with one of the dimensions based on the number of filters applied (e.g., the width, the height, and the number of filters, such as 32×32×12, if 12 were the number of filters).

One or more of the layers may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer.

One or more of the layers may include a pooling layer. The pooling layer may perform a down sampling operation along the spatial dimensions (e.g., the height and the width), which may result in a smaller volume than the input of the pooling layer (e.g., 16×16×12 from the 32×32×12 input volume).

One or more of the layers may include one or more fully connected layer(s). Each neuron in the fully connected layer(s) may be connected to each of the neurons in the previous volume. The fully connected layer may compute class scores, and the resulting volume may be 1×1×number of classes. In some examples, the CNN may include a fully connected layer(s) such that the output of one or more of the layers of the CNN may be provided as input to a fully connected layer(s) of the CNN. In some examples, one or more convolutional streams may be implemented by the machine learning model(s) 104, and some or all of the convolutional streams may include a respective fully connected layer(s).

In some non-limiting embodiments, the DNNs may include a series of convolutional and max pooling layers to facilitate image feature extraction, followed by multi-scale dilated convolutional and up-sampling layers to facilitate global context feature extraction.

Although input layers, convolutional layers, pooling layers, ReLU layers, and fully connected layers are discussed herein with respect to the DNNs, this is not intended to be limiting. For example, additional or alternative layers may be used in the DNNs, such as normalization layers, SoftMax layers, and/or other layer types.

In embodiments where the DNNs includes a CNN, different orders and numbers of the layers of the CNN may be used depending on the embodiment. In other words, the order and number of layers of the DNNs is not limited to any one architecture.

In addition, some of the layers may include parameters (e.g., weights and/or biases), such as the convolutional layers and the fully connected layers, while others may not, such as the ReLU layers and pooling layers. In some examples, the parameters may be learned by the DNNs during training. Further, some of the layers may include additional hyper-parameters (e.g., learning rate, stride, epochs, etc.), such as the convolutional layers, the fully connected layers, and the pooling layers, while other layers may not, such as the ReLU layers. The parameters and hyper-parameters are not to be limited and may differ depending on the embodiment.

Figure 7:
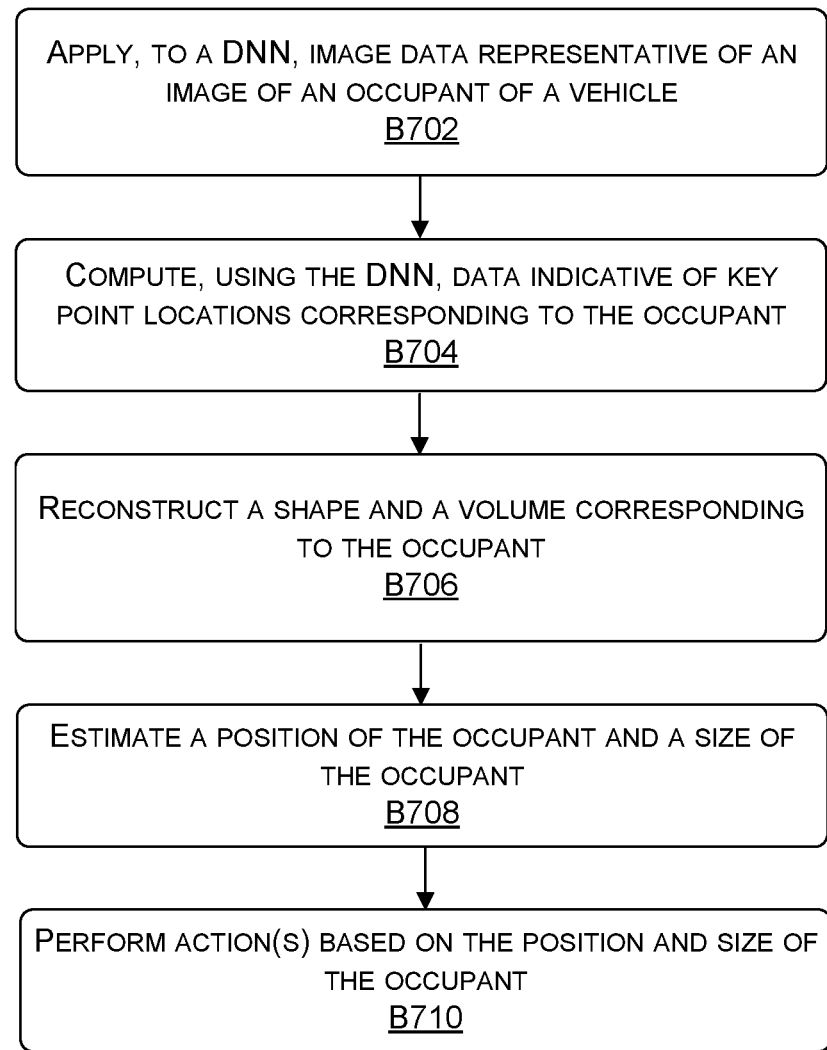
FIG. 7 is a flow diagram showing a method for performing actions based on a position and size of an occupant within a vehicle, in accordance with some embodiments of the present disclosure.
Figure 8:
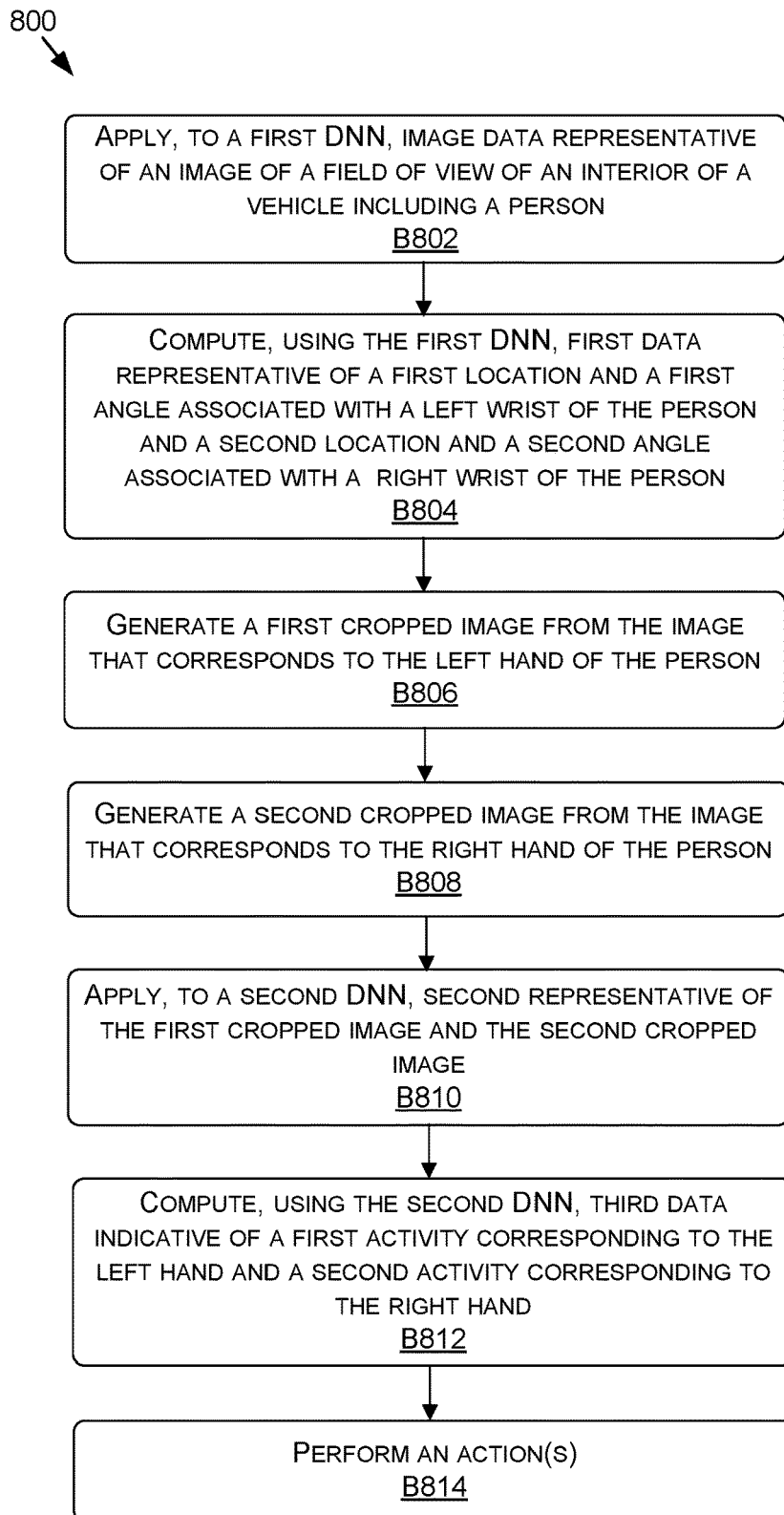
FIG. 8 is a flow diagram showing a method for performing actions based on one or more activities that relate to a person's hands that are performed by the person inside a vehicle, in accordance with some embodiments of the present disclosure.
Figure 9:
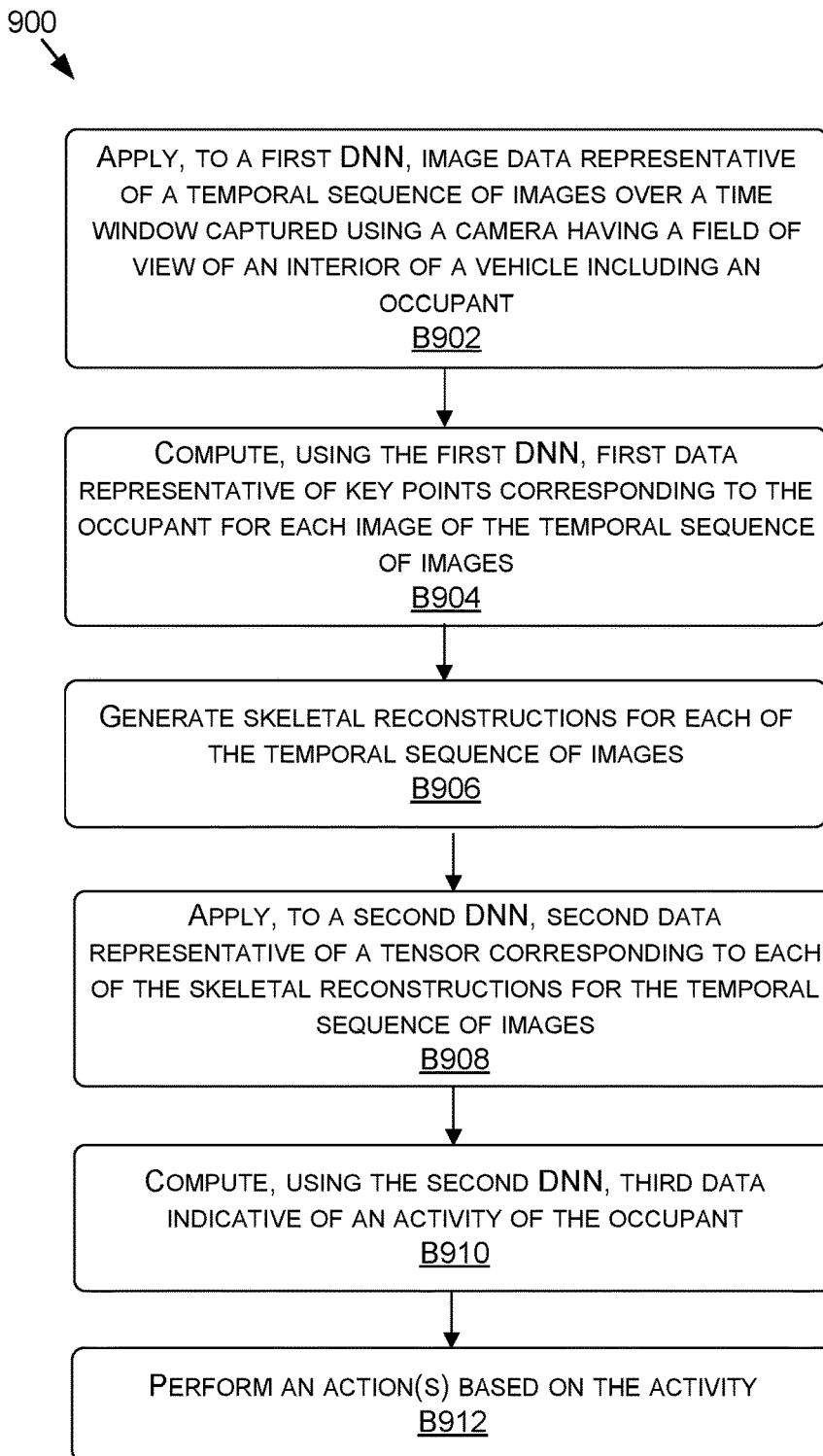
FIG. 9 is a flow diagram showing a method for performing actions based on an activity of an occupant within a vehicle, in accordance with some embodiments of the present disclosure.

Now referring to FIGS. 7, 8, and 9, each block of methods 700, 800, and 900, described herein, comprises a computing process that may be performed using any combination of hardware, firmware, and/or software. For instance, various functions may be carried out by a processor executing instructions stored in memory. The methods 700, 800, and 900 may also be embodied as computer-usable instructions stored on computer storage media. The methods 700, 800, and 900 may be provided by a standalone application, a service or hosted service (standalone or in combination with another hosted service), or a plug-in to another product, to name a few. In addition, methods 700, 800, and 900 is described, by way of example, with respect to the system 100 of FIG. 1 and the vehicle 1000 of FIGS. 10A-10D. However, these methods 700, 800, and 900 may additionally or alternatively be executed by any one system, or any combination of systems, including, but not limited to, those described herein.

With reference to FIG. 7, FIG. 7 is a flow diagram showing a method 700 for performing actions based on a position and size of an occupant within a vehicle, in accordance with some embodiments of the present disclosure. The method 700, at block B702, includes applying, to a DNN, image data representative of an image of an occupant of a vehicle. For example, the image data may be applied to the body-pose estimation and shape reconstruction network related to the body-pose estimator and shape reconstructor 102. In particular, the body-pose estimator and shape reconstructor 102 may receive image data representative of an image of an occupant in a vehicle and apply the image data to the body-pose estimation and shape reconstruction network. Such image data may be raw and/or pre-processed images (e.g., of the occupant inside the vehicle). As an example, the image data representative of an image may be a full frame containing the occupant.

The method 700, at block B704, includes computing, using the DNN, data indicative of key point locations corresponding to an occupant. Such data indicative of key point locations may be estimated locations and/or angles of body key points (e.g., joints and/or key features), such as, for non-limiting examples, locations of wrists, elbows, shoulders, hips, knees, feet, neck, eyes, ears, nose, etc. In addition, such data may further comprise body key point tags and/or labels (e.g., the elbow body key point may be tagged "left elbow"). Such computing of the data indicative of key point locations may be performed using, for example, the body-pose estimator and shape reconstructor 102.

The method 700, at block B706, includes reconstructing a shape and volume corresponding to the occupant. For example, the date indicative of key point locations corresponding to the occupant may be used to connect the key points according to an anatomical structure of a body, and the anatomical structure may be processed to reconstruct a shape and volume corresponding to the occupant (e.g., a body pose of the occupant). This shape reconstruction may correspond to a reconstruction of the body key points by shape and volume (e.g., an estimated shape of the occupant(s) including clothing and apparel, in embodiments). In addition, the reconstruction may correspond to a non-rigid deformation (e.g., a space-time coherent non-rigid deformation) of a surface corresponding to the occupant(s). Such reconstruction of a shape and volume of the occupant may be performed using, for example, the body-pose estimator and shape reconstructor 102. For instance, a DNN(s) and/or a post-processing algorithm may be used.

The method 700, at block B708, includes estimating a position of the occupant and a size of the occupant. For instance, the reconstructed shape and volume of the occupant may be used to estimate a position and size of the occupant. To estimate the position and size of the occupant, the body position and size estimator 106 may be used. In embodiments, the body position and size estimator 106 may use a trained body position network (e.g., a DNN(s)). In particular, the body position network may be used to analyze the position of drivers and/or passengers in a vehicle to determine if the body position is abnormal.

The method 700, at block B710, includes performing action(s) based on the position and size of the occupant. For example, the estimated body size and/or position may be used to make determinations such as whether a body pose is normal, whether a driver or passenger is in a position where airbags may safely be deployed, whether a driver or passenger is a size where airbags may safely be deployed (e.g., child v. adult), seat occupancy in a vehicle, etc. Actions may be performed using, for example the safety actuator 126. For instance, the safety actuator 126 may be used to send audio and/or visual notifications based on an identified activity in the vehicle (e.g., hands on wheel reminder), aid in control or actuation decisions (e.g., to activate or deactivate autonomous driving, to execute a safety procedure, etc.). In addition, the safety actuator 126 may carry out one or more actions based on the estimated position and size of the occupant (e.g., deactivating air-bags based on body position or size, etc.).

With reference to FIG. 8, FIG. 8 is a flow diagram showing a method 800 for performing actions based on one or more activities that relate to a person's hands that are performed by the person inside a vehicle, in accordance with some embodiments of the present disclosure. The method 800, at block B802, includes applying, to a first DNN, image data representative of an image of a field of view of an interior of a vehicle including a person. For example, image data may be applied to the body-pose estimation and shape reconstruction network related to the body-pose estimator and shape reconstructor 102. In particular, the body-pose estimator and shape reconstructor 102 may receive image data representative of an image of a field of view of an interior of a vehicle including a person and apply the image data to the body-pose estimation and shape reconstruction network. Such image data may be raw and/or pre-processed images (e.g., of the person inside the vehicle). As an example, the image data representative of an image may be a full frame of the interior of the vehicle containing the person.

The method 800, at block B804, includes computing, using the first DNN, first data representative of a first location and a first angle associated with a left wrist of the person and a second location and a second angle associated with a right wrist of the person. The first data representative of the first location the first angle associated with the first point may relate to body key point locations and associated angles of body key points (e.g., related to the left wrist and/or the left elbow). The second data representative of the second location the second angle associated with the second point may relate to body key point locations and associated angles of body key points (e.g., related to the right wrist and/or the right elbow). For example, the left wrist key point and the left elbow key point may be connected to form a line, and the angle of the line may correspond to the first angle. Similarly, the right wrist and the right elbow key points may be used to determine the second angle. Such data may be computed using, for example, the body-pose estimator and shape reconstructor 102.

The method 800, at block B806, includes generating a first cropped image from the image that corresponds to the left hand of the person. The first cropped image may be generated, for example, using hand bounding box 112 generated by the hand activity recognizer 110. In particular, the first cropped image may normalize the position of the left hand by centering a bounding box on the left hand. For instance, the first cropped image may be estimated based on the first data representative of the first location and the first angle associated with the line between the left wrist and left elbow key points. In particular, the direction of the elbow and wrist body key points may be used to estimate the placement of the bounding box to generate the first cropped image. Using such information, the left hand of the person may be centered in the first cropped image.

The method 800, at block B808, includes generating a second cropped image from the image that corresponds to the right hand of the person. The second cropped image may normalize the position of the right hand by centering a bounding box on the right hand. For instance, the second cropped image may be estimated based on the second data representative of the second location and the second angle associated with a line between the right wrist and right elbow key points. In particular, the direction of the elbow and wrist body key points may be used to estimate the placement of the bounding box to generate the second cropped image. Using such information, the right hand of the person may be centered in the second cropped image.

The method 800, at block B810, includes applying, to a second DNN, second data representative of the first cropped image and the second cropped image. For example, the first cropped image and the second cropped image may be applied to the hand network 114.

The method 800, at block B812, includes computing, using the second DNN, third data indicative of a first activity corresponding to the left hand and a second activity corresponding to the right hand. In particular, the hand activity recognition network 114 may output confidences for various classes in relation to each hand. For instance, the confidence can indicate the likelihood that each hand is performing a particular activity. Such activities may include texting, answering the phone, drinking or eating, operating the radio, hands on the steering wheel, hands off the steering wheel, etc. To determine the confidences for the various classes, one or more classifiers (e.g. the classifier 116) may be used.

The method 800, at block B814, includes performing an action. In particular, the first activity corresponding to the left hand and the second activity corresponding to the right hand may be used to make determinations such as whether the person inside the vehicle is engaged in one or more distracting activities. Actions may be performed using, for example the safety actuator 126. For instance, the safety actuator 126 may be used to send audio and/or visual notifications based on an identified activity in the vehicle (e.g., hands on wheel reminder), aid in control or actuation decisions (e.g., to activate or deactivate autonomous driving, to execute a safety procedure, etc.). In addition, the safety actuator 126 may carry out one or more actions based on the first and second activity.

In embodiments, the first and second activities for the right and left hand may undergo further analysis prior to performing the action, such as, for example, a priority may be associated with different activities such that when the right and left hand are classified as performing two different activities, one activity may be prioritized when determining some action to perform. In one example, when the right hand is classified as "on wheel" and the left hand is classified as "off wheel," the "on wheel" classification may be prioritized such that the system does not perform any action. In a different example, when the right hand is classified as "on wheel" and the left hand is classified as "texting," the "texting" classification may be prioritized such that the system issues an alert that texting must cease before manual control of the vehicle can be initiated.

Now referring to FIG. 9, FIG. 9 is a flow diagram showing a method 900 for performing actions based on an activity of an occupant within a vehicle, in accordance with some embodiments of the present disclosure. The method 900, at block B902, includes applying, to a first DNN, image data representative of a temporal sequence of images over a time window captured using a camera having a field of view of an interior of a vehicle including an occupant. In particular, the image data may be applied to a DNN. In embodiments, the DDN may be a body-pose estimation and shape reconstruction network related to the body-pose estimator and shape reconstructor 102. In particular, the body-pose estimator and shape reconstructor 102 may receive image data representative of an image of an occupant in a vehicle and apply the image data to the body-pose estimation and shape reconstruction network. Such image data may be raw and/or pre-processed images (e.g., of the occupant inside the vehicle). As an example, the image data representative of an image may be a full frame containing the occupant.

The method 900, at block B904, includes computing first data representative of key points corresponding to the occupant for each image of the temporal sequence of images. Such data indicative of key point locations may be estimated locations and/or angles of body key points (e.g., joints and/or key features), such as, for non-limiting examples, locations of wrists, elbows, shoulders, hips, knees, feet, neck, eyes, ears, nose, etc. In addition, such data may further comprise body key point tags and/or labels (e.g., the elbow body key point may be tagged "left elbow"). Such computing of the data indicative of key point locations may be performed using, for example, the body-pose estimator and shape reconstructor 102.

The method 900, at block B906, includes generating skeletal reconstructions for each of the temporal sequence of images. For example, the date indicative of key point locations corresponding to the occupant may be used to connect the key points according to an anatomical structure of a body, and the anatomical structure may be processed to generate a skeletal reconstruction corresponding to the occupant (e.g. a body pose of the occupant). This skeletal reconstruction may correspond to a reconstruction of the body key points by shape and volume (e.g., an estimated shape of the occupant(s) including clothing and apparel, in embodiments). In addition, the reconstruction may correspond to a non-rigid deformation (e.g., a space-time coherent non-rigid deformation) of a surface corresponding to the occupant(s). Such reconstruction of a shape and volume of the occupant may be performed using, for example, the body-pose estimator and shape reconstructor 102. For instance, a DNN(s) and/or a post-processing algorithm may be used.

The method 900, at block B908, includes applying second data representative of a tensor corresponding to each of the skeletal reconstructions for the temporal sequence of images. For example, data corresponding to a combination of the skeletal reconstructions of the sequence of images may be applied as a single input tensor to the body network 122.

The method 900, at block B910, includes computing third data indicative of an activity of the occupant. In particular, an activity of the occupant may be computed. Such activities may relate to pose variation of the body of the occupant over time. Such activities may include sudden sickness or fainting, fighting or aggressive behavior, normal behavior, etc. In such embodiments, the body activity recognizer 118 may be used to compute the third data indicative of the activity of the occupant.

The method 900, at block B912, includes performing action(s) based on the activity. Actions may be performed using, for example, the safety actuator 126. For instance, the safety actuator 126 may be used to send audio and/or visual notifications based on an identified activity in the vehicle (e.g., hands on wheel reminder), aid in control or actuation decisions (e.g., to activate or deactivate autonomous driving, to execute a safety procedure, etc.). In instances where the activities relate to the body of the occupant, the safety actuator 126 may perform the action(s) based on a body size and/or position.

Example Autonomous Vehicle

Figure 10A:
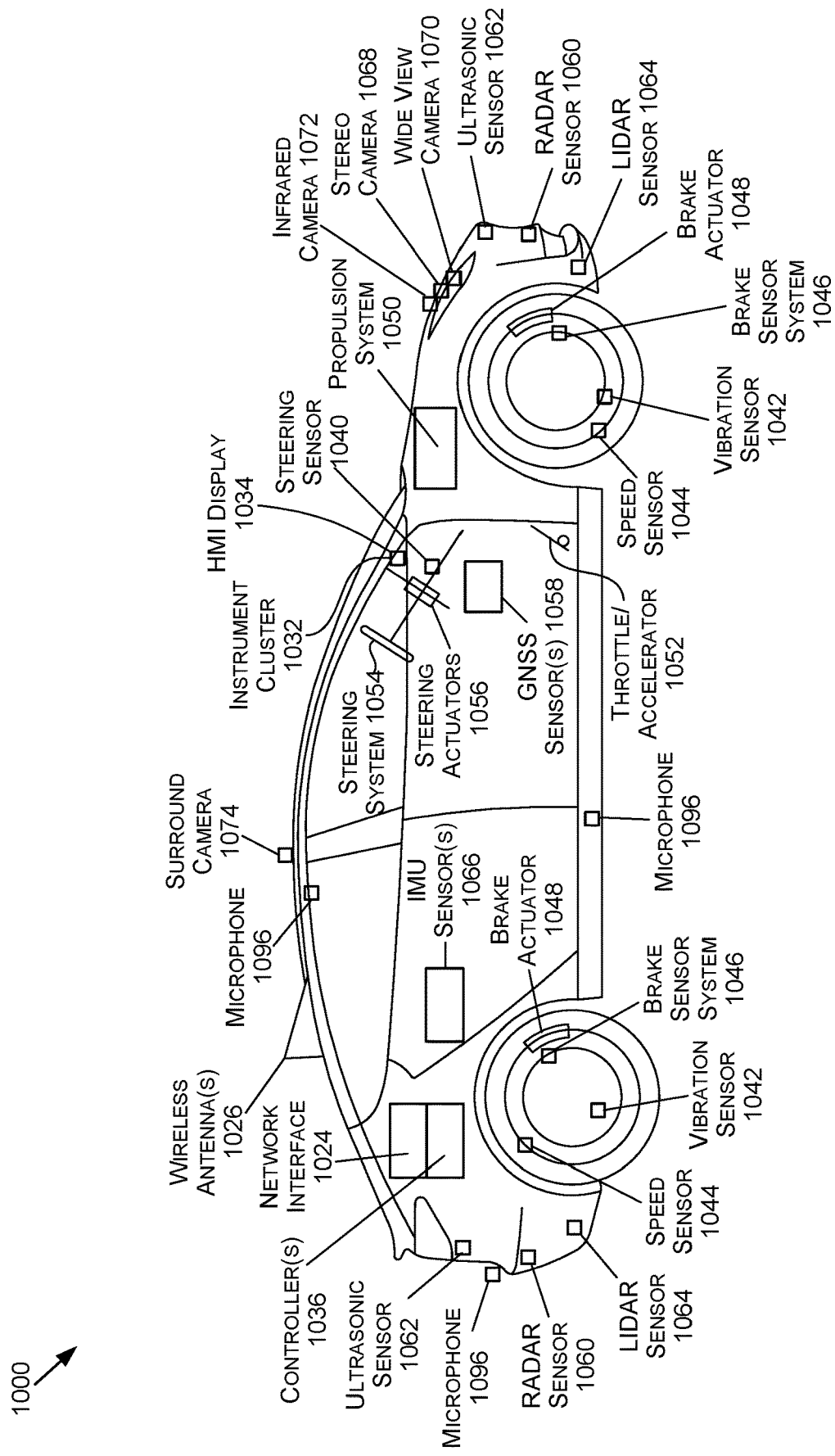
FIG. 10A is an illustration of an example autonomous vehicle, in accordance with some embodiments of the present disclosure.

FIG. 10A is an illustration of an example autonomous vehicle 1000, in accordance with some embodiments of the present disclosure. The autonomous vehicle 1000 (alternatively referred to herein as the "vehicle 1000") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1000 may be capable of functionality in accordance with one or more of Level 3-Level 5 of the autonomous driving levels. For example, the vehicle 1000 may be capable of conditional automation (Level 3), high automation (Level 4), and/or full automation (Level 5), depending on the embodiment.

The vehicle 1000 may include components such as a chassis, a vehicle body, wheels (e.g., 2, 4, 6, 8, 18, etc.), tires, axles, and other components of a vehicle. The vehicle 1000 may include a propulsion system 1050, such as an internal combustion engine, hybrid electric power plant, an all-electric engine, and/or another propulsion system type. The propulsion system 1050 may be connected to a drive train of the vehicle 1000, which may include a transmission, to enable the propulsion of the vehicle 1000. The propulsion system 1050 may be controlled in response to receiving signals from the throttle/accelerator 1052.

A steering system 1054, which may include a steering wheel, may be used to steer the vehicle 1000 (e.g., along a desired path or route) when the propulsion system 1050 is operating (e.g., when the vehicle is in motion). The steering system 1054 may receive signals from a steering actuator 1056. The steering wheel may be optional for full automation (Level 5) functionality.

The brake sensor system 1046 may be used to operate the vehicle brakes in response to receiving signals from the brake actuators 1048 and/or brake sensors.

Controller(s) 1036, which may include one or more system on chips (SoCs) 1004 (FIG. 10C) and/or GPU(s), may provide signals (e.g., representative of commands) to one or more components and/or systems of the vehicle 1000. For example, the controller(s) may send signals to operate the vehicle brakes via one or more brake actuators 1048, to operate the steering system 1054 via one or more steering actuators 1056, to operate the propulsion system 1050 via one or more throttle/accelerators 1052. The controller(s) 1036 may include one or more onboard (e.g., integrated) computing devices (e.g., supercomputers) that process sensor signals, and output operation commands (e.g., signals representing commands) to enable autonomous driving and/or to assist a human driver in driving the vehicle 1000. The controller(s) 1036 may include a first controller 1036 for autonomous driving functions, a second controller 1036 for functional safety functions, a third controller 1036 for artificial intelligence functionality (e.g., computer vision), a fourth controller 1036 for infotainment functionality, a fifth controller 1036 for redundancy in emergency conditions, and/or other controllers. In some examples, a single controller 1036 may handle two or more of the above functionalities, two or more controllers 1036 may handle a single functionality, and/or any combination thereof.

The controller(s) 1036 may provide the signals for controlling one or more components and/or systems of the vehicle 1000 in response to sensor data received from one or more sensors (e.g., sensor inputs). The sensor data may be received from, for example and without limitation, global navigation satellite systems sensor(s) 1058 (e.g., Global Positioning System sensor(s)), RADAR sensor(s) 1060, ultrasonic sensor(s) 1062, LIDAR sensor(s) 1064, inertial measurement unit (IMU) sensor(s) 1066 (e.g., accelerometer(s), gyroscope(s), magnetic compass(es), magnetometer(s), etc.), microphone(s) 1096, stereo camera(s) 1068, wide-view camera(s) 1070 (e.g., fisheye cameras), infrared camera(s) 1072, surround camera(s) 1074 (e.g., 360 degree cameras), long-range and/or mid-range camera(s) 1098, speed sensor(s) 1044 (e.g., for measuring the speed of the vehicle 1000), vibration sensor(s) 1042, steering sensor(s) 1040, brake sensor(s) (e.g., as part of the brake sensor system 1046), and/or other sensor types.

One or more of the controller(s) 1036 may receive inputs (e.g., represented by input data) from an instrument cluster 1032 of the vehicle 1000 and provide outputs (e.g., represented by output data, display data, etc.) via a human-machine interface (HMI) display 1034, an audible annunciator, a loudspeaker, and/or via other components of the vehicle 1000. The outputs may include information such as vehicle velocity, speed, time, map data (e.g., the HD map 1022 of FIG. 10C), location data (e.g., the vehicle's 1000 location, such as on a map), direction, location of other vehicles (e.g., an occupancy grid), information about objects and status of objects as perceived by the controller(s) 1036, etc. For example, the HMI display 1034 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1000 further includes a network interface 1024 which may use one or more wireless antenna(s) 1026 and/or modem(s) to communicate over one or more networks. For example, the network interface 1024 may be capable of communication over LTE, WCDMA, UMTS, GSM, CDMA2000, etc. The wireless antenna(s) 1026 may also enable communication between objects in the environment (e.g., vehicles, mobile devices, etc.), using local area network(s), such as Bluetooth, Bluetooth LE, Z-Wave, Zig-Bee, etc., and/or low power wide-area network(s) (LP-WANs), such as LoRaWAN, SigFox, etc.

Figure 10B:
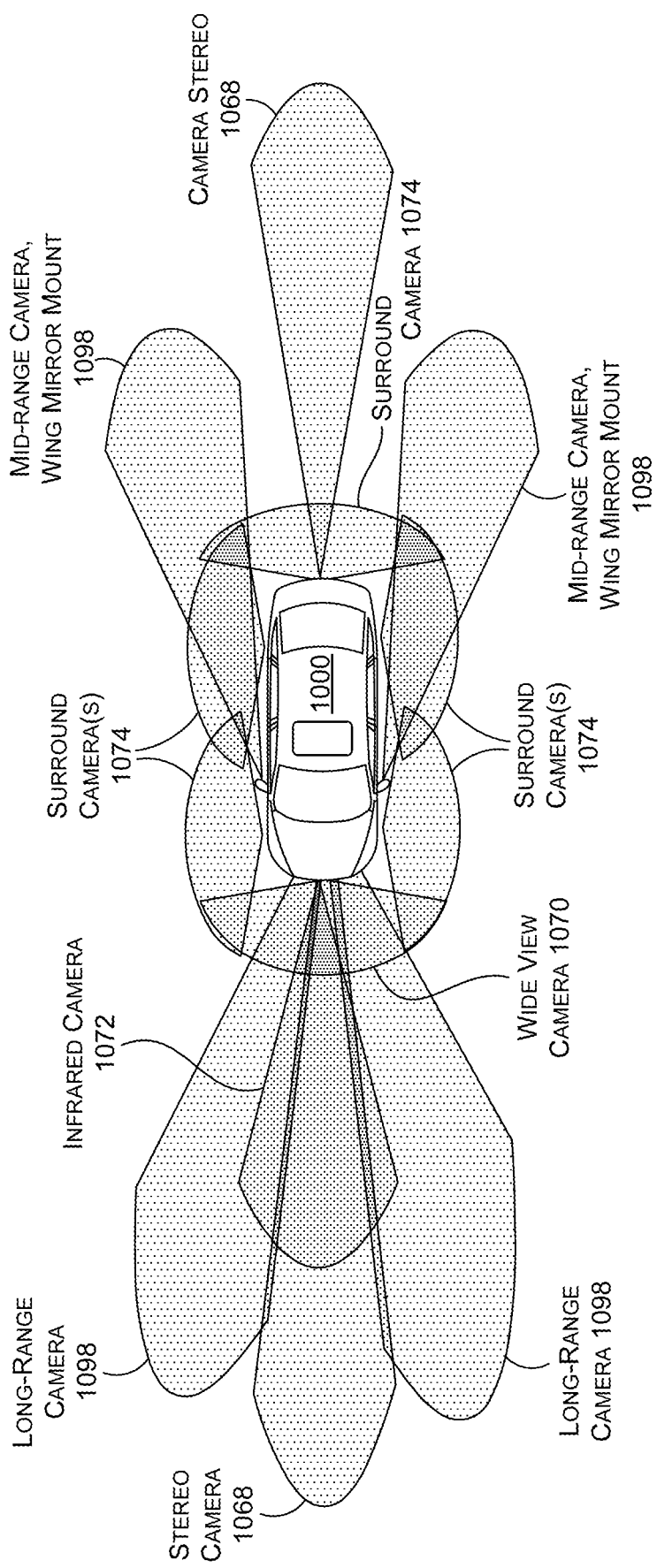
FIG. 10B is an example of camera locations and fields of view for the example autonomous vehicle of FIG. 10A, in accordance with some embodiments of the present disclosure.

FIG. 10B is an example of camera locations and fields of view for the example autonomous vehicle 1000 of FIG. 10A, in accordance with some embodiments of the present disclosure. The cameras and respective fields of view are one example embodiment and are not intended to be limiting. For example, additional and/or alternative cameras may be included and/or the cameras may be located at different locations on the vehicle 1000.

The camera types for the cameras may include, but are not limited to, digital cameras that may be adapted for use with the components and/or systems of the vehicle 1000. The camera(s) may operate at automotive safety integrity level (ASIL) B and/or at another ASIL. The camera types may be capable of any image capture rate, such as 60 frames per second (fps), 1020 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1000 (e.g., front-facing cameras) may be used for surround view, to help identify forward facing paths and obstacles, as well aid in, with the help of one or more controllers 1036 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 1070 that may be used to perceive objects coming into view from the periphery (e.g., pedestrians, crossing traffic or bicycles). Although only one wide-view camera is illustrated in FIG. 10B, there may any number of wide-view cameras 1070 on the vehicle 1000. In addition, long-range camera(s) 1098 (e.g., a long-view stereo camera pair) may be used for depth-based object detection, especially for objects for which a neural network has not yet been trained. The long-range camera(s) 1098 may also be used for object detection and classification, as well as basic object tracking.

One or more stereo cameras 1068 may also be included in a front-facing configuration. The stereo camera(s) 1068 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 1068 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1068 may be used in addition to, or alternatively from, those described herein.

Cameras with a field of view that include portions of the environment to the side of the vehicle 1000 (e.g., side-view cameras) may be used for surround view, providing information used to create and update the occupancy grid, as well as to generate side impact collision warnings. For example, surround camera(s) 1074 (e.g., four surround cameras 1074 as illustrated in FIG. 10B) may be positioned to on the vehicle 1000. The surround camera(s) 1074 may include wide-view camera(s) 1070, fisheye camera(s), 360 degree camera(s), and/or the like. Four example, four fisheye cameras may be positioned on the vehicle's front, rear, and sides. In an alternative arrangement, the vehicle may use three surround camera(s) 1074 (e.g., left, right, and rear), and may leverage one or more other camera(s) (e.g., a forward-facing camera) as a fourth surround view camera.

Cameras with a field of view that include portions of the environment to the rear of the vehicle 1000 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1098, stereo camera(s) 1068), infrared camera(s) 1072, etc.), as described herein.

Figure 10C:
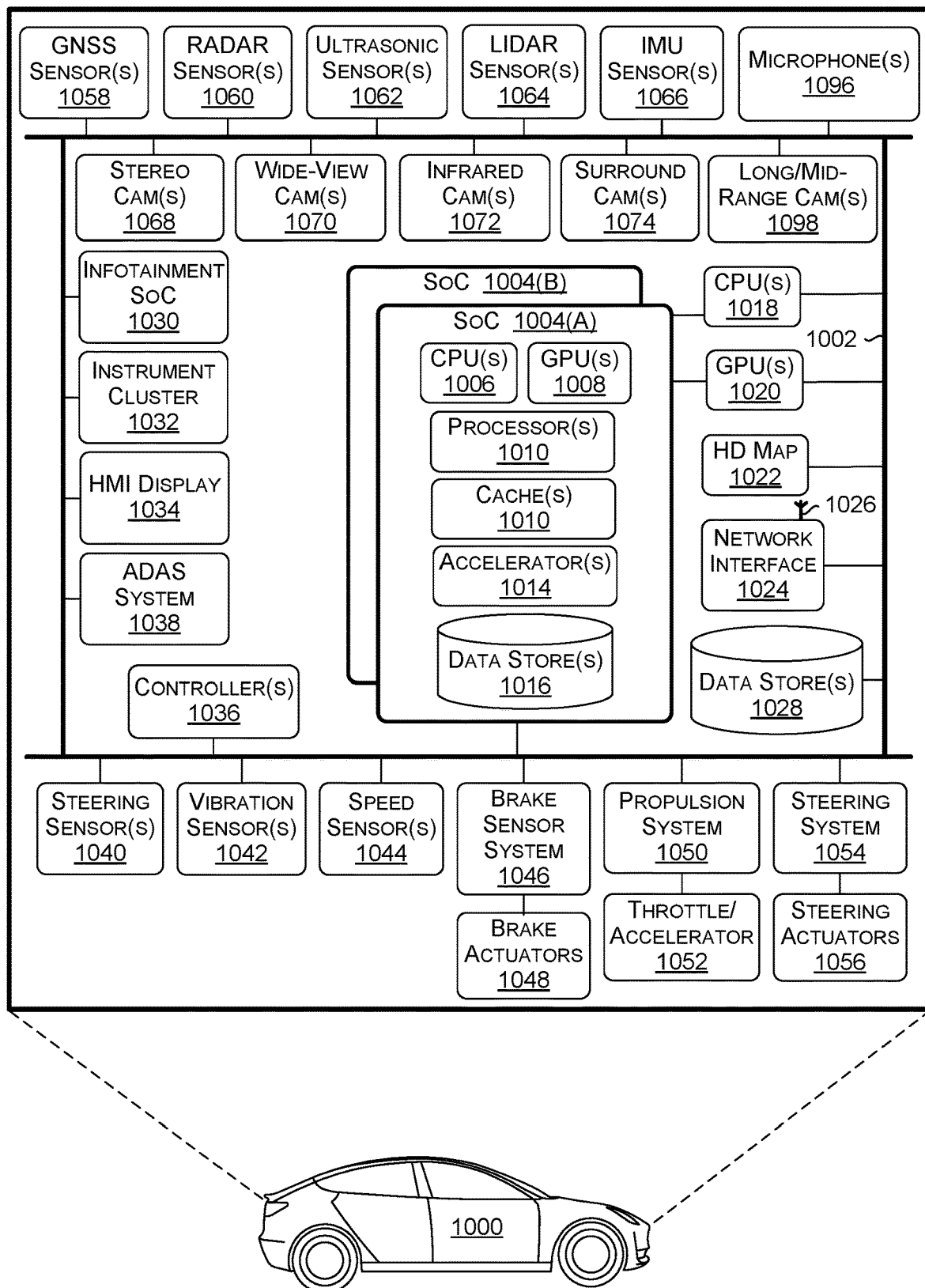
FIG. 10C is a block diagram of an example system architecture for the example autonomous vehicle of FIG. 10A, in accordance with some embodiments of the present disclosure.

FIG. 10C is a block diagram of an example system architecture for the example autonomous vehicle 1000 of FIG. 10A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1000 in FIG. 10C are illustrated as being connected via bus 1002. The bus 1002 may include a Controller Area Network (CAN) data interface (alternatively referred to herein as a "CAN bus"). A CAN may be a network inside the vehicle 1000 used to aid in control of various features and functionality of the vehicle 1000, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1002 is described herein as being a CAN bus, this is not intended to be limiting. For example, in addition to, or alternatively from, the CAN bus, FlexRay and/or Ethernet may be used. Additionally, although a single line is used to represent the bus 1002, this is not intended to be limiting. For example, there may be any number of busses 1002, which may include one or more CAN busses, one or more FlexRay busses, one or more Ethernet busses, and/or one or more other types of busses using a different protocol. In some examples, two or more busses 1002 may be used to perform different functions, and/or may be used for redundancy. For example, a first bus 1002 may be used for collision avoidance functionality and a second bus 1002 may be used for actuation control. In any example, each bus 1002 may communicate with any of the components of the vehicle 1000, and two or more busses 1002 may communicate with the same components. In some examples, each SoC 1004, each controller 1036, and/or each computer within the vehicle may have access to the same input data (e.g., inputs from sensors of the vehicle 1000), and may be connected to a common bus, such the CAN bus.

The vehicle 1000 may include one or more controller(s) 1036, such as those described herein with respect to FIG. 10A. The controller(s) 1036 may be used for a variety of functions. The controller(s) 1036 may be coupled to any of the various other components and systems of the vehicle 1000, and may be used for control of the vehicle 1000, artificial intelligence of the vehicle 1000, infotainment for the vehicle 1000, and/or the like.

The vehicle 1000 may include a system(s) on a chip (SoC) 1004. The SoC 1004 may include CPU(s) 1006, GPU(s) 1008, processor(s) 1010, cache(s) 1012, accelerator(s) 1014, data store(s) 1016, and/or other components and features not illustrated. The SoC(s) 1004 may be used to control the vehicle 1000 in a variety of platforms and systems. For example, the SoC(s) 1004 may be combined in a system (e.g., the system of the vehicle 1000) with an HD map 1022 which may obtain map refreshes and/or updates via a network interface 1024 from one or more servers (e.g., server(s) 1078 of FIG. 10D).

The CPU(s) 1006 may include a CPU cluster or CPU complex (alternatively referred to herein as a "CCPLEX"). The CPU(s) 1006 may include multiple cores and/or L2 caches. For example, in some embodiments, the CPU(s) 1006 may include eight cores in a coherent multi-processor configuration. In some embodiments, the CPU(s) 1006 may include four dual-core clusters where each cluster has a dedicated L2 cache (e.g., a 2 MB L2 cache). The CPU(s) 1006 (e.g., the CCPLEX) may be configured to support simultaneous cluster operation enabling any combination of the clusters of the CPU(s) 1006 to be active at any given time.

The CPU(s) 1006 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1006 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1008 may include an integrated GPU (alternatively referred to herein as an "iGPU"). The GPU(s) 1008 may be programmable and may be efficient for parallel workloads. The GPU(s) 1008, in some examples, may use an enhanced tensor instruction set. The GPU(s) 1008 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1008 may include at least eight streaming microprocessors. The GPU(s) 1008 may use compute application programming interface(s) (API(s)). In addition, the GPU(s) 1008 may use one or more parallel computing platforms and/or programming models (e.g., NVIDIA's CUDA).

The GPU(s) 1008 may be power-optimized for best performance in automotive and embedded use cases. For example, the GPU(s) 1008 may be fabricated on a Fin field-effect transistor (FinFET). However, this is not intended to be limiting and the GPU(s) 1008 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1008 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1008 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1008 to access the CPU(s) 1006 page tables directly. In such examples, when the GPU(s) 1008 memory management unit (MMU) experiences a miss, an address translation request may be transmitted to the CPU(s) 1006. In response, the CPU(s) 1006 may look in its page tables for the virtual-to-physical mapping for the address and transmits the translation back to the GPU(s) 1008. As such, unified memory technology may allow a single unified virtual address space for memory of both the CPU(s) 1006 and the GPU(s) 1008, thereby simplifying the GPU(s) 1008 programming and porting of applications to the GPU(s) 1008.

In addition, the GPU(s) 1008 may include an access counter that may keep track of the frequency of access of the GPU(s) 1008 to memory of other processors. The access counter may help ensure that memory pages are moved to the physical memory of the processor that is accessing the pages most frequently.

The SoC(s) 1004 may include any number of cache(s) 1012, including those described herein. For example, the cache(s) 1012 may include an L3 cache that is available to both the CPU(s) 1006 and the GPU(s) 1008 (e.g., that is connected both the CPU(s) 1006 and the GPU(s) 1008). The cache(s) 1012 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1004 may include an arithmetic logic unit(s) (ALU(s)) which may be leveraged in performing processing with respect to any of the variety of tasks or operations of the vehicle 1000—such as processing DNNs. In addition, the SoC(s) 1004 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 1006 and/or GPU(s) 1008.

The SoC(s) 1004 may include one or more accelerators 1014 (e.g., hardware accelerators, software accelerators, or a combination thereof). For example, the SoC(s) 1004 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1008 and to off-load some of the tasks of the GPU(s) 1008 (e.g., to free up more cycles of the GPU(s) 1008 for performing other tasks). As an example, the accelerator(s) 1014 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1014 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1008, and by using an inference accelerator, for example, a designer may target either the DLA(s) or the GPU(s) 1008 for any function. For example, the designer may focus processing of CNNs and floating point operations on the DLA(s) and leave other functions to the GPU(s) 1008 and/or other accelerator(s) 1014.

The accelerator(s) 1014 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1006. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1014 (e.g., the hardware acceleration cluster) may include a computer vision network on-chip and SRAM, for providing a high-bandwidth, low latency SRAM for the accelerator(s) 1014. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1004 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1014 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1066 output that correlates with the vehicle 1000 orientation, distance, 3D location estimates of the object obtained from the neural network and/or other sensors (e.g., LIDAR sensor(s) 1064 or RADAR sensor(s) 1060), among others.

The SoC(s) 1004 may include data store(s) 1016 (e.g., memory). The data store(s) 1016 may be on-chip memory of the SoC(s) 1004, which may store neural networks to be executed on the GPU and/or the DLA. In some examples, the data store(s) 1016 may be large enough in capacity to store multiple instances of neural networks for redundancy and safety. The data store(s) 1012 may comprise L2 or L3 cache(s) 1012. Reference to the data store(s) 1016 may include reference to the memory associated with the PVA, DLA, and/or other accelerator(s) 1014, as described herein.

The SoC(s) 1004 may include one or more processor(s) 1010 (e.g., embedded processors). The processor(s) 1010 may include a boot and power management processor that may be a dedicated processor and subsystem to handle boot power and management functions and related security enforcement. The boot and power management processor may be a part of the SoC(s) 1004 boot sequence and may provide runtime power management services. The boot power and management processor may provide clock and voltage programming, assistance in system low power state transitions, management of SoC(s) 1004 thermals and temperature sensors, and/or management of the SoC(s) 1004 power states. Each temperature sensor may be implemented as a ring-oscillator whose output frequency is proportional to temperature, and the SoC(s) 1004 may use the ring-oscillators to detect temperatures of the CPU(s) 1006, GPU(s) 1008, and/or accelerator(s) 1014. If temperatures are determined to exceed a threshold, the boot and power management processor may enter a temperature fault routine and put the SoC(s) 1004 into a lower power state and/or put the vehicle 1000 into a chauffeur to safe stop mode (e.g., bring the vehicle 1000 to a safe stop).

The processor(s) 1010 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1010 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1010 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1010 may further include a real-time camera engine that may include a dedicated processor subsystem for handling real-time camera management.

The processor(s) 1010 may further include a high-dynamic range signal processor that may include an image signal processor that is a hardware engine that is part of the camera processing pipeline.

The processor(s) 1010 may include a video image compositor that may be a processing block (e.g., implemented on a microprocessor) that implements video post-processing functions needed by a video playback application to produce the final image for the player window. The video image compositor may perform lens distortion correction on wide-view camera(s) 1070, surround camera(s) 1074, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1008 is not required to continuously render new surfaces. Even when the GPU(s) 1008 is powered on and active doing 3D rendering, the video image compositor may be used to offload the GPU(s) 1008 to improve performance and responsiveness.

The SoC(s) 1004 may further include a mobile industry processor interface (MIPI) camera serial interface for receiving video and input from cameras, a high-speed interface, and/or a video input block that may be used for camera and related pixel input functions. The SoC(s) 1004 may further include an input/output controller(s) that may be controlled by software and may be used for receiving I/O signals that are uncommitted to a specific role.

The SoC(s) 1004 may further include a broad range of peripheral interfaces to enable communication with peripherals, audio codecs, power management, and/or other devices. The SoC(s) 1004 may be used to process data from cameras (e.g., connected over Gigabit Multimedia Serial Link and Ethernet), sensors (e.g., LIDAR sensor(s) 1064, RADAR sensor(s) 1060, etc. that may be connected over Ethernet), data from bus 1002 (e.g., speed of vehicle 1000, steering wheel position, etc.), data from GNSS sensor(s) 1058 (e.g., connected over Ethernet or CAN bus). The SoC(s) 1004 may further include dedicated high-performance mass storage controllers that may include their own DMA engines, and that may be used to free the CPU(s) 1006 from routine data management tasks.

The SoC(s) 1004 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1004 may be faster, more reliable, and even more energy-efficient and space-efficient than conventional systems. For example, the accelerator(s) 1014, when combined with the CPU(s) 1006, the GPU(s) 1008, and the data store(s) 1016, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1020) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1008.

In some examples, a CNN for facial recognition and vehicle owner identification may use data from camera sensors to identify the presence of an authorized driver and/or owner of the vehicle 1000. The always on sensor processing engine may be used to unlock the vehicle when the owner approaches the driver door and turn on the lights, and, in security mode, to disable the vehicle when the owner leaves the vehicle. In this way, the SoC(s) 1004 provide for security against theft and/or carjacking.

In another example, a CNN for emergency vehicle detection and identification may use data from microphones 1096 to detect and identify emergency vehicle sirens. In contrast to conventional systems, that use general classifiers to detect sirens and manually extract features, the SoC(s) 1004 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1058. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1062, until the emergency vehicle(s) passes.

The vehicle may include a CPU(s) 1018 (e.g., discrete CPU(s), or dCPU(s)), that may be coupled to the SoC(s) 1004 via a high-speed interconnect (e.g., PCIe). The CPU(s) 1018 may include an X86 processor, for example. The CPU(s) 1018 may be used to perform any of a variety of functions, including arbitrating potentially inconsistent results between ADAS sensors and the SoC(s) 1004, and/or monitoring the status and health of the controller(s) 1036 and/or infotainment SoC 1030, for example.

The vehicle 1000 may include a GPU(s) 1020 (e.g., discrete GPU(s), or dGPU(s)), that may be coupled to the SoC(s) 1004 via a high-speed interconnect (e.g., NVIDIA's NVLINK). The GPU(s) 1020 may provide additional artificial intelligence functionality, such as by executing redundant and/or different neural networks, and may be used to train and/or update neural networks based on input (e.g., sensor data) from sensors of the vehicle 1000.

The vehicle 1000 may further include the network interface 1024 which may include one or more wireless antennas 1026 (e.g., one or more wireless antennas for different communication protocols, such as a cellular antenna, a Bluetooth antenna, etc.). The network interface 1024 may be used to enable wireless connectivity over the Internet with the cloud (e.g., with the server(s) 1078 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1000 information about vehicles in proximity to the vehicle 1000 (e.g., vehicles in front of, on the side of, and/or behind the vehicle 1000). This functionality may be part of a cooperative adaptive cruise control functionality of the vehicle 1000.

The network interface 1024 may include a SoC that provides modulation and demodulation functionality and enables the controller(s) 1036 to communicate over wireless networks. The network interface 1024 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1000 may further include data store(s) 1028 which may include off-chip (e.g., off the SoC(s) 1004) storage. The data store(s) 1028 may include one or more storage elements including RAM, SRAM, DRAM, VRAM, Flash, hard disks, and/or other components and/or devices that may store at least one bit of data.

The vehicle 1000 may further include GNSS sensor(s) 1058. The GNSS sensor(s) 1058 (e.g., GPS, assisted GPS sensors, differential GPS (DGPS) sensors, etc.), to assist in mapping, perception, occupancy grid generation, and/or path planning functions. Any number of GNSS sensor(s) 1058 may be used, including, for example and without limitation, a GPS using a USB connector with an Ethernet to Serial (RS-232) bridge.

The vehicle 1000 may further include RADAR sensor(s) 1060. The RADAR sensor(s) 1060 may be used by the vehicle 1000 for long-range vehicle detection, even in darkness and/or severe weather conditions. RADAR functional safety levels may be ASIL B. The RADAR sensor(s) 1060 may use the CAN and/or the bus 1002 (e.g., to transmit data generated by the RADAR sensor(s) 1060) for control and to access object tracking data, with access to Ethernet to access raw data in some examples. A wide variety of RADAR sensor types may be used. For example, and without limitation, the RADAR sensor(s) 1060 may be suitable for front, rear, and side RADAR use. In some example, Pulse Doppler RADAR sensor(s) are used.

The RADAR sensor(s) 1060 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1060 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1000 surroundings at higher speeds with minimal interference from traffic in adjacent lanes. The other two antennae may expand the field of view, making it possible to quickly detect vehicles entering or leaving the vehicle's 1000 lane.

Mid-range RADAR systems may include, as an example, a range of up to 1060 m (front) or 80 m (rear), and a field of view of up to 42 degrees (front) or 1050 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1000 may further include ultrasonic sensor(s) 1062. The ultrasonic sensor(s) 1062, which may be positioned at the front, back, and/or the sides of the vehicle 1000, may be used for park assist and/or to create and update an occupancy grid. A wide variety of ultrasonic sensor(s) 1062 may be used, and different ultrasonic sensor(s) 1062 may be used for different ranges of detection (e.g., 2.5 m, 4 m). The ultrasonic sensor(s) 1062 may operate at functional safety levels of ASIL B.

The vehicle 1000 may include LIDAR sensor(s) 1064. The LIDAR sensor(s) 1064 may be used for object and pedestrian detection, emergency braking, collision avoidance, and/or other functions. The LIDAR sensor(s) 1064 may be functional safety level ASIL B. In some examples, the vehicle 1000 may include multiple LIDAR sensors 1064 (e.g., two, four, six, etc.) that may use Ethernet (e.g., to provide data to a Gigabit Ethernet switch).

In some examples, the LIDAR sensor(s) 1064 may be capable of providing a list of objects and their distances for a 360-degree field of view. Commercially available LIDAR sensor(s) 1064 may have an advertised range of approximately 1000 m, with an accuracy of 2 cm-3 cm, and with support for a 1000 Mbps Ethernet connection, for example. In some examples, one or more non-protruding LIDAR sensors 1064 may be used. In such examples, the LIDAR sensor(s) 1064 may be implemented as a small device that may be embedded into the front, rear, sides, and/or corners of the vehicle 1000. The LIDAR sensor(s) 1064, in such examples, may provide up to a 1020-degree horizontal and 35-degree vertical field-of-view, with a 200 m range even for low-reflectivity objects. Front-mounted LIDAR sensor(s) 1064 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1000. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1064 may be less susceptible to motion blur, vibration, and/or shock.

The vehicle may further include IMU sensor(s) 1066. The IMU sensor(s) 1066 may be located at a center of the rear axle of the vehicle 1000, in some examples. The IMU sensor(s) 1066 may include, for example and without limitation, an accelerometer(s), a magnetometer(s), a gyroscope(s), a magnetic compass(es), and/or other sensor types. In some examples, such as in six-axis applications, the IMU sensor(s) 1066 may include accelerometers and gyroscopes, while in nine-axis applications, the IMU sensor(s) 1066 may include accelerometers, gyroscopes, and magnetometers.

In some embodiments, the IMU sensor(s) 1066 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1066 may enable the vehicle 1000 to estimate heading without requiring input from a magnetic sensor by directly observing and correlating the changes in velocity from GPS to the IMU sensor(s) 1066. In some examples, the IMU sensor(s) 1066 and the GNSS sensor(s) 1058 may be combined in a single integrated unit.

The vehicle may include microphone(s) 1096 placed in and/or around the vehicle 1000. The microphone(s) 1096 may be used for emergency vehicle detection and identification, among other things.

The vehicle may further include any number of camera types, including stereo camera(s) 1068, wide-view camera(s) 1070, infrared camera(s) 1072, surround camera(s) 1074, long-range and/or mid-range camera(s) 1098, and/or other camera types. The cameras may be used to capture image data around an entire periphery of the vehicle 1000. The types of cameras used depends on the embodiments and requirements for the vehicle 1000, and any combination of camera types may be used to provide the necessary coverage around the vehicle 1000. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 10A and FIG. 10B.

The vehicle 1000 may further include vibration sensor(s) 1042. The vibration sensor(s) 1042 may measure vibrations of components of the vehicle, such as the axle(s). For example, changes in vibrations may indicate a change in road surfaces. In another example, when two or more vibration sensors 1042 are used, the differences between the vibrations may be used to determine friction or slippage of the road surface (e.g., when the difference in vibration is between a power-driven axle and a freely rotating axle).

The vehicle 1000 may include an ADAS system 1038. The ADAS system 1038 may include a SoC, in some examples. The ADAS system 1038 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1060, LIDAR sensor(s) 1064, and/or a camera(s). The ACC systems may include longitudinal ACC and/or lateral ACC. Longitudinal ACC monitors and controls the distance to the vehicle immediately ahead of the vehicle 1000 and automatically adjust the vehicle speed to maintain a safe distance from vehicles ahead. Lateral ACC performs distance keeping, and advises the vehicle 1000 to change lanes when necessary. Lateral ACC is related to other ADAS applications such as LCA and CWS.

CACC uses information from other vehicles that may be received via the network interface 1024 and/or the wireless antenna(s) 1026 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1000), while the I2V communication concept provides information about traffic further ahead. CACC systems may include either or both I2V and V2V information sources. Given the information of the vehicles ahead of the vehicle 1000, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1060, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1060, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1000 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1000 if the vehicle 1000 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1060, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1000 is backing up. Some RCTW systems include AEB to ensure that the vehicle brakes are applied to avoid a crash. RCTW systems may use one or more rear-facing RADAR sensor(s) 1060, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1000, the vehicle 1000 itself must, in the case of conflicting results, decide whether to heed the result from a primary computer or a secondary computer (e.g., a first controller 1036 or a second controller 1036). For example, in some embodiments, the ADAS system 1038 may be a backup and/or secondary computer for providing perception information to a backup computer rationality module. The backup computer rationality monitor may run a redundant diverse software on hardware components to detect faults in perception and dynamic driving tasks. Outputs from the ADAS system 1038 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1004.

In other examples, ADAS system 1038 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1038 may be fed into the primary computer's perception block and/or the primary computer's dynamic driving task block. For example, if the ADAS system 1038 indicates a forward crash warning due to an object immediately ahead, the perception block may use this information when identifying objects. In other examples, the secondary computer may have its own neural network which is trained and thus reduces the risk of false positives, as described herein.

The vehicle 1000 may further include the infotainment SoC 1030 (e.g., an in-vehicle infotainment system (IVI)). Although illustrated and described as a SoC, the infotainment system may not be a SoC, and may include two or more discrete components. The infotainment SoC 1030 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1000. For example, the infotainment SoC 1030 may radios, disk players, navigation systems, video players, USB and Bluetooth connectivity, carputers, in-car entertainment, Wi-Fi, steering wheel audio controls, hands free voice control, a heads-up display (HUD), an HMI display 1034, a telematics device, a control panel (e.g., for controlling and/or interacting with various components, features, and/or systems), and/or other components. The infotainment SoC 1030 may further be used to provide information (e.g., visual and/or audible) to a user(s) of the vehicle, such as information from the ADAS system 1038, autonomous driving information such as planned vehicle maneuvers, trajectories, surrounding environment information (e.g., intersection information, vehicle information, road information, etc.), and/or other information.

The infotainment SoC 1030 may include GPU functionality. The infotainment SoC 1030 may communicate over the bus 1002 (e.g., CAN bus, Ethernet, etc.) with other devices, systems, and/or components of the vehicle 1000. In some examples, the infotainment SoC 1030 may be coupled to a supervisory MCU such that the GPU of the infotainment system may perform some self-driving functions in the event that the primary controller(s) 1036 (e.g., the primary and/or backup computers of the vehicle 1000) fail. In such an example, the infotainment SoC 1030 may put the vehicle 1000 into a chauffeur to safe stop mode, as described herein.

The vehicle 1000 may further include an instrument cluster 1032 (e.g., a digital dash, an electronic instrument cluster, a digital instrument panel, etc.). The instrument cluster 1032 may include a controller and/or supercomputer (e.g., a discrete controller or supercomputer). The instrument cluster 1032 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1030 and the instrument cluster 1032. In other words, the instrument cluster 1032 may be included as part of the infotainment SoC 1030, or vice versa.

FIG. 10D is a system diagram for communication between cloud-based server(s) and the example autonomous vehicle 1000 of FIG. 10A, in accordance with some embodiments of the present disclosure. The system 1076 may include server(s) 1078, network(s) 1090, and vehicles, including the vehicle 1000. The server(s) 1078 may include a plurality of GPUs 1084(A)-1084(H) (collectively referred to herein as GPUs 1084), PCIe switches 1082(A)-1082(H) (collectively referred to herein as PCIe switches 1082), and/or CPUs 1080(A)-1080(B) (collectively referred to herein as CPUs 1080). The GPUs 1084, the CPUs 1080, and the PCIe switches may be interconnected with high-speed interconnects such as, for example and without limitation, NVLink interfaces 1088 developed by NVIDIA and/or PCIe connections 1086. In some examples, the GPUs 1084 are connected via NVLink and/or NVSwitch SoC and the GPUs 1084 and the PCIe switches 1082 are connected via PCIe interconnects. Although eight GPUs 1084, two CPUs 1080, and two PCIe switches are illustrated, this is not intended to be limiting. Depending on the embodiment, each of the server(s) 1078 may include any number of GPUs 1084, CPUs 1080, and/or PCIe switches. For example, the server(s) 1078 may each include eight, sixteen, thirty-two, and/or more GPUs 1084.

The server(s) 1078 may receive, over the network(s) 1090 and from the vehicles, image data representative of images showing unexpected or changed road conditions, such as recently commenced road-work. The server(s) 1078 may transmit, over the network(s) 1090 and to the vehicles, neural networks 1092, updated neural networks 1092, and/or map information 1094, including information regarding traffic and road conditions. The updates to the map information 1094 may include updates for the HD map 1022, such as information regarding construction sites, potholes, detours, flooding, and/or other obstructions. In some examples, the neural networks 1092, the updated neural networks 1092, and/or the map information 1094 may have resulted from new training and/or experiences represented in data received from any number of vehicles in the environment, and/or based on training performed at a datacenter (e.g., using the server(s) 1078 and/or other servers).

The server(s) 1078 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1090, and/or the machine learning models may be used by the server(s) 1078 to remotely monitor the vehicles.

In some examples, the server(s) 1078 may receive data from the vehicles and apply the data to up-to-date real-time neural networks for real-time intelligent inferencing. The server(s) 1078 may include deep-learning supercomputers and/or dedicated AI computers powered by GPU(s) 1084, such as a DGX and DGX Station machines developed by NVIDIA. However, in some examples, the server(s) 1078 may include deep learning infrastructure that use only CPU-powered datacenters.

The deep-learning infrastructure of the server(s) 1078 may be capable of fast, real-time inferencing, and may use that capability to evaluate and verify the health of the processors, software, and/or associated hardware in the vehicle 1000. For example, the deep-learning infrastructure may receive periodic updates from the vehicle 1000, such as a sequence of images and/or objects that the vehicle 1000 has located in that sequence of images (e.g., via computer vision and/or other machine learning object classification techniques). The deep-learning infrastructure may run its own neural network to identify the objects and compare them with the objects identified by the vehicle 1000 and, if the results do not match and the infrastructure concludes that the AI in the vehicle 1000 is malfunctioning, the server(s) 1078 may transmit a signal to the vehicle 1000 instructing a fail-safe computer of the vehicle 1000 to assume control, notify the passengers, and complete a safe parking maneuver.

For inferencing, the server(s) 1078 may include the GPU(s) 1084 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

FIG. 11 is a block diagram of an example computing device(s) 1100 suitable for use in implementing some embodiments of the present disclosure. Computing device 1100 may include an interconnect system 1102 that directly or indirectly couples the following devices: memory 1104, one or more central processing units (CPUs) 1106, one or more graphics processing units (GPUs) 1108, a communication interface 1110, input/output (I/O) ports 1112, input/output components 1114, a power supply 1116, one or more presentation components 1118 (e.g., display(s)), and one or more logic units 1120.

Although the various blocks of FIG. 11 are shown as connected via the interconnect system 1102 with lines, this is not intended to be limiting and is for clarity only. For example, in some embodiments, a presentation component 1118, such as a display device, may be considered an I/O component 1114 (e.g., if the display is a touch screen). As another example, the CPUs 1106 and/or GPUs 1108 may include memory (e.g., the memory 1104 may be representative of a storage device in addition to the memory of the GPUs 1108, the CPUs 1106, and/or other components). In other words, the computing device of FIG. 11 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 11.

The interconnect system 1102 may represent one or more links or busses, such as an address bus, a data bus, a control bus, or a combination thereof. The interconnect system 1102 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1106 may be directly connected to the memory 1104. Further, the CPU 1106 may be directly connected to the GPU 1108. Where there is direct, or point-to-point connection between components, the interconnect system 1102 may include a PCIe link to carry out the connection. In these examples, a PCI bus need not be included in the computing device 1100.

The memory 1104 may include any of a variety of computer-readable media. The computer-readable media may be any available media that may be accessed by the computing device 1100. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1104 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1100. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1106 may be configured to execute at least some of the computer-readable instructions to control one or more components of the computing device 1100 to perform one or more of the methods and/or processes described herein. The CPU(s) 1106 may each include one or more cores (e.g., one, two, four, eight, twenty-eight, seventy-two, etc.) that are capable of handling a multitude of software threads simultaneously. The CPU(s) 1106 may include any type of processor, and may include different types of processors depending on the type of computing device 1100 implemented (e.g., processors with fewer cores for mobile devices and processors with more cores for servers). For example, depending on the type of computing device 1100, the processor may be an Advanced RISC Machines (ARM) processor implemented using Reduced Instruction Set Computing (RISC) or an x86 processor implemented using Complex Instruction Set Computing (CISC). The computing device 1100 may include one or more CPUs 1106 in addition to one or more microprocessors or supplementary co-processors, such as math co-processors.

In addition to or alternatively from the CPU(s) 1106, the GPU(s) 1108 may be configured to execute at least some of the computer-readable instructions to control one or more components of the computing device 1100 to perform one or more of the methods and/or processes described herein. One or more of the GPU(s) 1108 may be an integrated GPU (e.g., with one or more of the CPU(s) 1106 and/or one or more of the GPU(s) 1108 may be a discrete GPU. In embodiments, one or more of the GPU(s) 1108 may be a coprocessor of one or more of the CPU(s) 1106. The GPU(s) 1108 may be used by the computing device 1100 to render graphics (e.g., 3D graphics) or perform general purpose computations. For example, the GPU(s) 1108 may be used for General-Purpose computing on GPUs (GPGPU). The GPU(s) 1108 may include hundreds or thousands of cores that are capable of handling hundreds or thousands of software threads simultaneously. The GPU(s) 1108 may generate pixel data for output images in response to rendering commands (e.g., rendering commands from the CPU(s) 1106 received via a host interface). The GPU(s) 1108 may include graphics memory, such as display memory, for storing pixel data or any other suitable data, such as GPGPU data. The display memory may be included as part of the memory 1104. The GPU(s) 1108 may include two or more GPUs operating in parallel (e.g., via a link). The link may directly connect the GPUs (e.g., using NVLINK) or may connect the GPUs through a switch (e.g., using NVSwitch). When combined together, each GPU 1108 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1106 and/or the GPU(s) 1108, the logic unit(s) 1120 may be configured to execute at least some of the computer-readable instructions to control one or more components of the computing device 1100 to perform one or more of the methods and/or processes described herein. In embodiments, the CPU(s) 1106, the GPU(s) 1108, and/or the logic unit(s) 1120 may discretely or jointly perform any combination of the methods, processes and/or portions thereof. One or more of the logic units 1120 may be part of and/or integrated in one or more of the CPU(s) 1106 and/or the GPU(s) 1108 and/or one or more of the logic units 1120 may be discrete components or otherwise external to the CPU(s) 1106 and/or the GPU(s) 1108. In embodiments, one or more of the logic units 1120 may be a coprocessor of one or more of the CPU(s) 1106 and/or one or more of the GPU(s) 1108.

Examples of the logic unit(s) 1120 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1110 may include one or more receivers, transmitters, and/or transceivers that enable the computing device 1100 to communicate with other computing devices via an electronic communication network, included wired and/or wireless communications. The communication interface 1110 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 1112 may enable the computing device 1100 to be logically coupled to other devices including the I/O components 1114, the presentation component(s) 1118, and/or other components, some of which may be built in to (e.g., integrated in) the computing device 1100. Illustrative I/O components 1114 include a microphone, mouse, keyboard, joystick, game pad, game controller, satellite dish, scanner, printer, wireless device, etc. The I/O components 1114 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1100. The computing device 1100 may be include depth cameras, such as stereoscopic camera systems, infrared camera systems, RGB camera systems, touchscreen technology, and combinations of these, for gesture detection and recognition. Additionally, the computing device 1100 may include accelerometers or gyroscopes (e.g., as part of an inertia measurement unit (IMU)) that enable detection of motion. In some examples, the output of the accelerometers or gyroscopes may be used by the computing device 1100 to render immersive augmented reality or virtual reality.

The power supply 1116 may include a hard-wired power supply, a battery power supply, or a combination thereof.

The power supply 1116 may provide power to the computing device 1100 to enable the components of the computing device 1100 to operate.

The presentation component(s) 1118 may include a display (e.g., a monitor, a touch screen, a television screen, a heads-up-display (HUD), other display types, or a combination thereof), speakers, and/or other presentation components. The presentation component(s) 1118 may receive data from other components (e.g., the GPU(s) 1108, the CPU(s) 1106, etc.), and output the data (e.g., as an image, video, sound, etc.).

Examples Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1100 of FIG. 11—e.g., each device may include similar components, features, and/or functionality of the computing device(s) 1100.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1100 described herein with respect to FIG. 11. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
    determining, using one or more neural networks and based at least on image data representative of an image depicting an occupant of an autonomous or semi-autonomous machine, one or more three-dimensional (3D) key point locations within a volume of space enclosed by the autonomous or semi-autonomous machine that are associated with the occupant;
    determining, based at least on the one or more 3D key point locations, an activity associated with the occupant; and
    performing, based at least on the activity associated with the occupant, one or more operations associated with the autonomous or semi-autonomous machine.

2. The method of claim 1, further comprising:
    Determining, using the one or more neural networks and based at least on second image data representative of a second image depicting the occupant of the autonomous or semi-autonomous machine, one or more second 3D key point locations within a volume of space enclosed by the autonomous or semi-autonomous machine that are associated with the occupant,
    wherein the determining the activity associated with the occupant is further based at least on the one or more second 3D key point locations.

3. The method of claim 1, further comprising:
    determining, based at least on the one or more 3D key point locations, a model associated with at least one of the image or the occupant,
    wherein the determining the activity associated with the occupant is based at least on the model.

4. The method of claim 1, wherein:
    the one or more neural networks comprise a first neural network and a second neural network;
    the determining of the one or more 3D key point locations associated with the occupant is performed using the first neural network; and
    the determining the activity associated with the occupant is performed using the second neural network.

5. The method of claim 1, further comprising:
    determining, based at least on the one or more 3D key point locations, a confidence associated with the activity,
    wherein the determining the activity associated with the occupant is based at least on the confidence.

6. The method of claim 1, further comprising:
    determining, based at least on the one or more 3D key point locations, at least one of a first activity associated with a first hand of the occupant or a second activity associated with a second hand of the occupant,
    wherein the determining the activity associated with the occupant is based at least on the at least one of the first activity associated with the first hand of the occupant or the second activity associated with the second hand of the occupant.

7. The method of claim 1, further comprising:
    determining, using the one or more neural networks and based at least on the image data, one or more angles associated with one or more appendages of the occupant,
    wherein the determining the activity associated with the occupant is further based at least on the one or more angles associated with the one or more appendages.

8. The method of claim 1, wherein the one or more 3D key point locations is a plurality of 3D key point locations, and wherein the method further comprises:
    determining a connection between at least a first 3D key point location of the plurality of 3D key point locations and a second 3D key point location of the plurality of 3D key point locations,
    wherein the determining the activity associated with the occupant is based at least on the connection between the first 3D key point location and the second 3D key point location.

9. The method of claim 1, further comprising:
    determining, using the one or more neural networks and based at least on one or more of the image data or second image data representative of a second image depicting a second occupant of the autonomous or semi-autonomous machine, one or more second 3D key point locations within a volume of space enclosed by the autonomous or semi-autonomous machine that are associated with the second occupant; and
    determining, based at least on the one or more second 3D key point locations, a second activity associated with the second occupant,
    wherein the performing the one or more operations associated with the autonomous or semi-autonomous machine is further based at least on the second activity associated with the second occupant.

10. The method of claim 1, wherein the determining the one or more 3D key point locations within the autonomous or semi-autonomous machine that are associated with the occupant comprises:
    determining, using the one or more neural networks and based at least on the image data representative of the image depicting the occupant, one or more two-dimensional (2D) key point locations of the image that are associated with the occupant; and
    determining, based at least on the one or more 2D key point locations of the image, the one or more 3D key point locations within a volume of space enclosed by the autonomous or semi-autonomous machine that are associated with the occupant.

11. A system comprising:
    one or more processing units to:
        determine, based at least on image data representative of an image depicting an occupant of an autonomous or semi-autonomous machine, one or more key point locations associated with the occupant;
        apply data representative of the one or more key point locations to one or more neural networks as input;
        determine, using the one or more neural networks and based at least on the data representative of the one or more key point locations, an activity associated with the occupant; and
        perform, based at least on the activity associated with the occupant, one or more operations associated with the autonomous or semi-autonomous machine.

12. The system of claim 11, wherein the one or more processing units are further to:
    determine, based at least on second image data representative of a second image depicting the occupant of the autonomous or semi-autonomous machine, one or more second key point locations associated with the occupant,
    wherein the determination of the activity associated with the occupant is further based at least on the one or more second key point locations.

13. The system of claim 11, wherein the determination of the activity associated with the occupant comprises:
- determining, using the one or more neural networks and based at least on the data representative of the one or more key point locations, a model associated with at least one of the occupant or the image; and
- determining the activity associated with the occupant based at least on the model.

14. The system of claim 11, wherein:
- the one or more neural networks comprise a first neural network and a second neural network;
- the determination of the one or more key point locations associated with the occupant is performed using the first neural network; and
- the determination of the activity associated with the occupant is performed using the second neural network.

15. The system of claim 11, wherein the one or more processing units are further:
- determine, using the one or more neural networks and based at least on the data representative of the one or more key point locations, a confidence associated with the activity,
- wherein the determination of the activity associated with the occupant is further based at least on the confidence.

16. The system of claim 11, wherein the determination of the activity associated with the occupant comprises:
- determining, using the one or more neural networks and based at least on the data representative of the one or more key point locations, at least one of a first activity associated with a first hand of the occupant or a second activity associated with a second hand of the occupant; and
- determining the activity associated with the occupant based at least on the at least one of the first activity associated with the first hand of the occupant or the second activity associated with the second hand of the occupant.

17. The system of claim 11, wherein the one or more key point locations is a plurality of key point locations, and wherein the one or more processing units are further to:
- determine a connection between at least a first key point location of the plurality of key point locations and a second key point location of the plurality of key point locations,
- wherein the determination of the activity associated with the occupant is further based at least on the connection between the first key point location and the second key point location.

18. The system of claim 11, wherein the system is comprised in at least one of:
- a control system for the autonomous or semi-autonomous machine;
- a perception system for the autonomous or semi-autonomous machine;
- a system for performing simulation operations;
- a system for performing digital twin operations;
- a system for performing real-time streaming;
- a system for generating or presenting virtual reality (VR) content;
- a system for generating or presenting augmented reality (AR) content;
- a system for generating or presenting mixed reality (MR) content;
- a system for performing light transport simulation;
- a system for performing collaborative content creation for 3D assets;
- a system for performing deep learning operations;
- a system implemented using an edge device;
- a system implemented using a robot;
- a system for performing conversational AI operations;
- a system for generating synthetic data;
- a system incorporating one or more virtual machines (VMs);
- a system implemented at least partially in a data center; or
- a system implemented at least partially using cloud computing resources.

19. A processor comprising:
- one or more processing units to perform one or more operations associated with an autonomous or semi-autonomous machine based at least on an activity associated with an occupant of the autonomous or semi-autonomous machine, wherein the activity associated with the occupant is determined using one or more neural networks and based at least on first image data representative of a first cropped image depicting a first hand of the occupant and second image data representative of a second cropped image depicting a second hand of the occupant.

20. The processor of claim 19, wherein the processor is comprised in at least a control system for the autonomous or semi-autonomous machine;
- a perception system for the autonomous or semi-autonomous machine;
- a system for performing simulation operations;
- a system for performing digital twin operations;
- a system for performing real-time streaming;
- a system for generating or presenting virtual reality (VR) content;
- a system for generating or presenting augmented reality (AR) content;
- a system for generating or presenting mixed reality (MR) content;
- a system for performing light transport simulation;
- a system for performing collaborative content creation for 3D assets;
- a system for performing deep learning operations;
- a system implemented using an edge device;
- a system implemented using a robot;
- a system for performing conversational AI operations;
- a system for generating synthetic data;
- a system incorporating one or more virtual machines (VMs);
- a system implemented at least partially in a data center; or
- a system implemented at least partially using cloud computing resources.

* * * * *